US012504669B2

(12) United States Patent
Kaya

(10) Patent No.: US 12,504,669 B2
(45) Date of Patent: Dec. 23, 2025

(54) PRINTER AND DIGITAL CAMERA INCLUDING PRINTER

(71) Applicant: FUJIFILM Corporation, Tokyo (JP)

(72) Inventor: Akimasa Kaya, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 127 days.

(21) Appl. No.: 18/477,754

(22) Filed: Sep. 29, 2023

(65) Prior Publication Data

US 2024/0019759 A1 Jan. 18, 2024

Related U.S. Application Data

(63) Continuation of application No. PCT/JP2022/015515, filed on Mar. 29, 2022.

(30) Foreign Application Priority Data

Mar. 31, 2021 (JP) ................ 2021-061454

(51) Int. Cl.
*G03B 1/32* (2021.01)
*B41J 3/44* (2006.01)
*B41J 13/03* (2006.01)
*G03B 17/52* (2021.01)
*H04N 23/80* (2023.01)

(52) U.S. Cl.
CPC ............ *G03B 1/32* (2013.01); *B41J 3/445* (2013.01); *B41J 13/03* (2013.01); *G03B 17/52* (2013.01); *H04N 23/80* (2023.01)

(58) Field of Classification Search
None
See application file for complete search history.

(56) References Cited

U.S. PATENT DOCUMENTS 5,026,041 A 6/1991 Kitazume et al.
10,488,736 B2* 11/2019 Nakai ................... G03B 17/50
2015/0338773 A1* 11/2015 Takagi ............... G03G 15/0865
399/262

(Continued)

FOREIGN PATENT DOCUMENTS

JP H02-79328 U1 6/1990
JP 2005300838 A * 10/2005

(Continued)

OTHER PUBLICATIONS

English translation of JP-2005300838-A, Takagi, 2005 (Year: 2005).*

(Continued)

*Primary Examiner* — James M Hannett
(74) *Attorney, Agent, or Firm* — Studebaker Brackett PLLC

(57) ABSTRACT

A printer unit includes a device housing including a transport roller and a spreading roller, a roller drive mechanism that is attached to the device housing and includes a drive transmission gear train that drives the transport roller and the spreading roller, and a cover member that covers the roller drive mechanism. The roller drive mechanism includes a gear plate separate from the cover member. The gear plate is fixed to the device housing at two locations and is formed in a plate shape that pivotally supports at least one of rotational shafts of the drive transmission gear train.

4 Claims, 19 Drawing Sheets

(56) References Cited

U.S. PATENT DOCUMENTS

2018/0316810 A1* 11/2018 Kozaki .............. H04N 1/00798

FOREIGN PATENT DOCUMENTS

| JP | 2014-144863 A | | 8/2014 |
|----|---------------|---|--------|
| JP | 2018-186390 A | | 11/2018 |
| JP | 2019-148612 A | | 9/2019 |
| JP | 2020033111 A | * | 3/2020 |

OTHER PUBLICATIONS

English translation of JP-2020033111-A, Takahashi, 2020 (Year: 2020).*
International Search Report issued in PCT/JP2022/015515; mailed Jun. 7, 2022.
Written Opinion of the International Searching Authority issued in PCT/JP2022/015515; mailed Jun. 7, 2022.
An Office Action; "Notice of Reasons for Refusal," mailed by the Japanese Patent Office on Aug. 19, 2025, which corresponds to Japanese Patent Application No. 2023-511388 and is related to U.S. Appl. No. 18/477,754; with English language translation.

* cited by examiner

FIG. 15
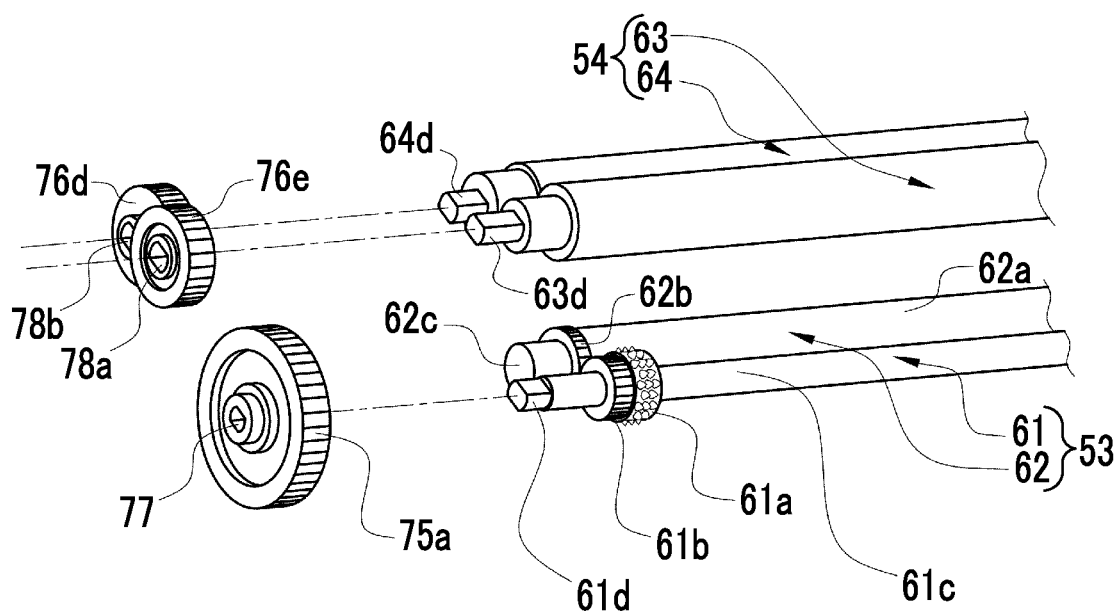
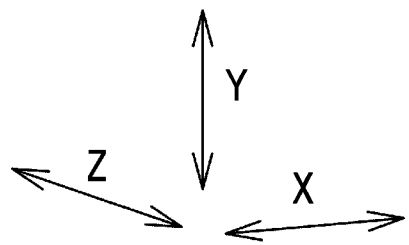

PRINTER AND DIGITAL CAMERA INCLUDING PRINTER

CROSS-REFERENCE TO RELATED APPLICATIONS

This application is a Continuation of PCT International Application No. PCT/JP2022/015515 filed on 29 Mar. 2022, which claims priority under 35 U.S.C § 119(a) to Japanese Patent Application No. 2021-061454 filed on 31 Mar. 2021. The above application is hereby expressly incorporated by reference, in its entirety, into the present application.

BACKGROUND OF THE INVENTION

1. Field of the Invention

The present invention relates to a printer and a digital camera including a printer.

2. Description of the Related Art

Various mobile printers or digital cameras including a printer for recording images imaged by a digital camera or a smartphone on a recording medium such as an instant film have been on sale.

In general, a printer or a digital camera including a printer that uses an instant film as a recording medium has a configuration comprising a loading room, a transport roller, a spreading roller, and a roller drive mechanism. An instant film pack that accommodates a plurality of instant films in a case is loaded into the loading room. The transport roller transports the instant film in a state of pinching both side edge portions of the instant film. The spreading roller spreads a developer by crushing a developer pod of the instant film.

The roller drive mechanism drives the spreading roller and the transport roller, and includes, for example, a motor as a drive source, a plurality of gears for transmitting a rotational driving force, and the like. The gear constituting the drive mechanism is pivotally supported by a part of the loading room or a cover member fixed to the loading room. The cover member is formed in a box shape for accommodating a plurality of gears and the like (for example, see JP2005-300838A).

SUMMARY OF THE INVENTION

However, in the printer or the digital camera including a printer that comprises the roller drive mechanism as described above, since the plurality of gears are pivotally supported by the cover member, a reaction force acting between the plurality of rotating gears during drive transmission acts the cover member to bend the cover member. In a case where the cover member is curved, since a position of the gear pivotally supported by the cover member varies and positions of the transport roller and the spreading roller deviate from each other, deterioration in feeding accuracy of the instant film and spreading unevenness of the developer by the spreading roller are caused, and image quality deteriorates.

The present invention has been made to solve the above-mentioned problems, and an object of the present invention is to provide a printer and a digital camera including a printer capable of preventing a variation in a gear position due to a reaction force between gears and suppressing deterioration in image quality.

In order to solve the above-mentioned problems, a printer according to an aspect of the present invention is a printer that exposes an image to an instant film including a developer pod including a developer, and spreads the developer. The printer comprises a transport roller, a spreading roller, a device housing, a roller drive mechanism, and a cover member. The roller drive mechanism includes a plate-shaped gear plate separate from the cover member, the gear plate being fixed to the device housing at least two locations, and pivotally supporting at least one of a rotational shaft of the transport roller, a rotational shaft of the spreading roller, or a rotational shaft of the drive transmission gear train. The transport roller transports the instant film toward a discharge port. The spreading roller is disposed on a downstream side in a transport direction with respect to the transport roller, and spreads the developer by crushing the developer pod in a state of pinching the instant film. The device housing includes the transport roller and the spreading roller. The roller drive mechanism is attached to the device housing and includes a drive transmission gear train that drives the transport roller and the spreading roller. The cover member covers the roller drive mechanism.

It is preferable that the gear plate includes a fixing unit for being fixed to the device housing, and a bearing unit for pivotally supporting at least one of the rotational shafts, and a portion connecting the fixing units, the bearing units, or the fixing unit and the bearing unit is formed in a linear shape.

It is preferable that a gear provided in the rotational shaft of the transport roller, a gear provided in the rotational shaft of the spreading roller, and the drive transmission gear train are disposed on a side close to the device housing and a side opposite to the device housing with respect to the gear plate.

It is preferable that the roller drive mechanism includes a motor as a drive source and the drive transmission gear train, the drive transmission gear train includes a first sub-gear train that transmits rotational driving force from the motor, a second sub-gear train that receives the transmission of the rotational driving force from the first sub-gear train, and transmits the rotational driving force to the transport roller, and a third sub-gear train that receives the transmission of the rotational driving force from the first sub-gear train, and transmits the rotational driving force to the spreading roller, the second sub-gear train is disposed on a side close to the device housing with respect to the gear plate, and the third sub-gear train is disposed on a side opposite to the device housing with respect to the gear plate.

A digital camera including a printer according to an aspect of the present invention comprises the printer, and an imaging unit that includes an imaging optical system and images a subject image to output image data to the printer.

According to the present invention, it is possible to prevent the variation in the gear position due to the reaction force between the gears and suppress the deterioration in the image quality.

BRIEF DESCRIPTION OF THE DRAWINGS

FIG. 15 is a perspective view of a gear connected to a transport roller and a spreading roller.

DESCRIPTION OF THE PREFERRED EMBODIMENTS

[Overview of Digital Camera Including Printer]

Figure 1:
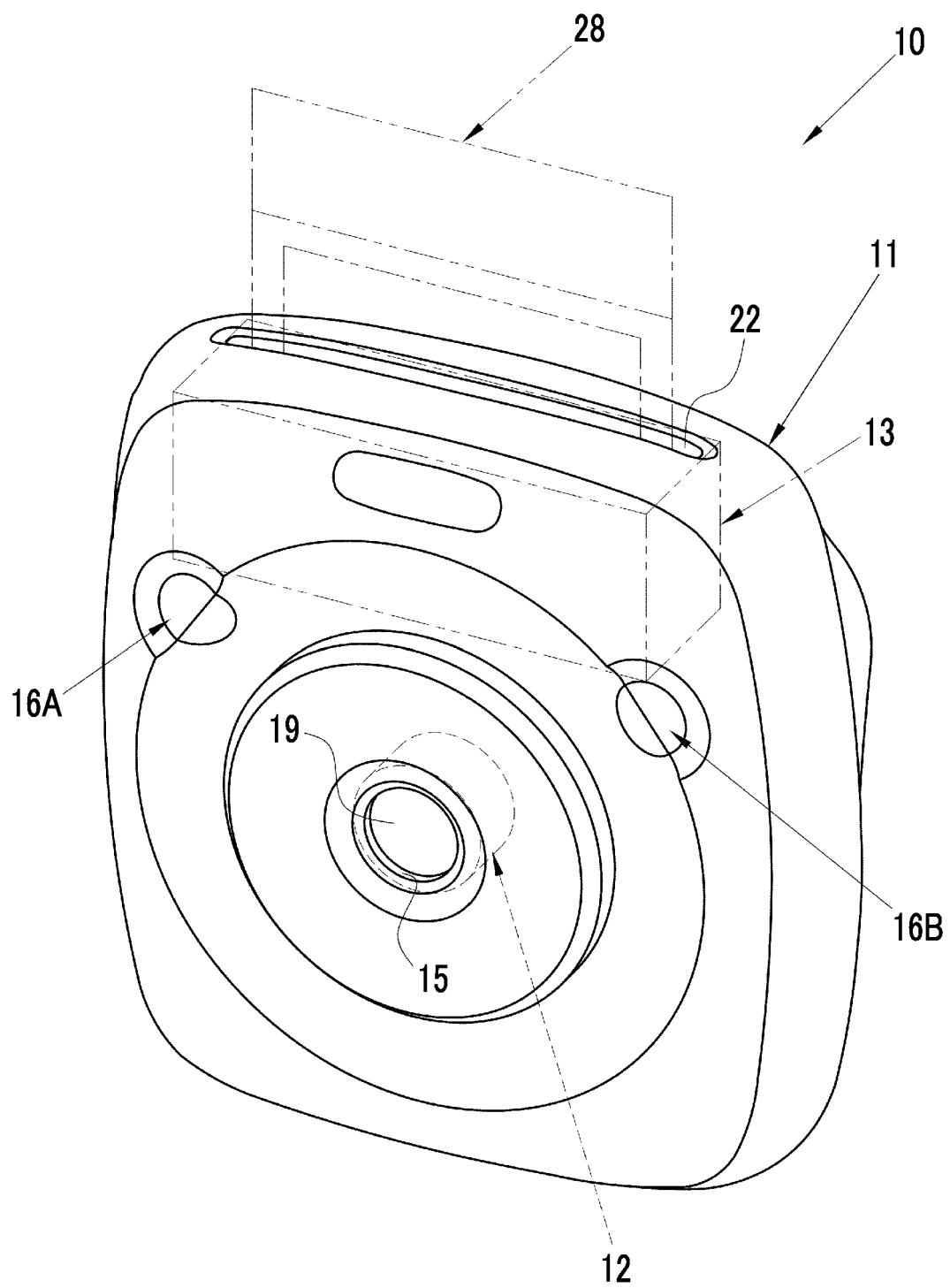
FIG. 1 is a front perspective view of a digital camera including a printer.

In FIG. 1, a digital camera 10 including a printer according to an embodiment of the present invention comprises a camera body 11, an imaging unit 12, and a printer unit 13. An imaging window 15 and two release switches 16A and 16B are provided on a front surface of the camera body 11.

The camera body 11 has a substantially square shape viewed from a front surface. The digital camera 10 including a printer uses an instant film 28 (see FIG. 9). The instant film 28 is, for example, a square-shaped instant film. The present invention is not limited thereto, and a wide type or card type instant film may be used.

The imaging window 15 is disposed in a center on the front surface of the camera body 11. The imaging window 15 exposes an imaging optical system 19 (see FIG. 2) constituting the imaging unit 12.

Figure 2:
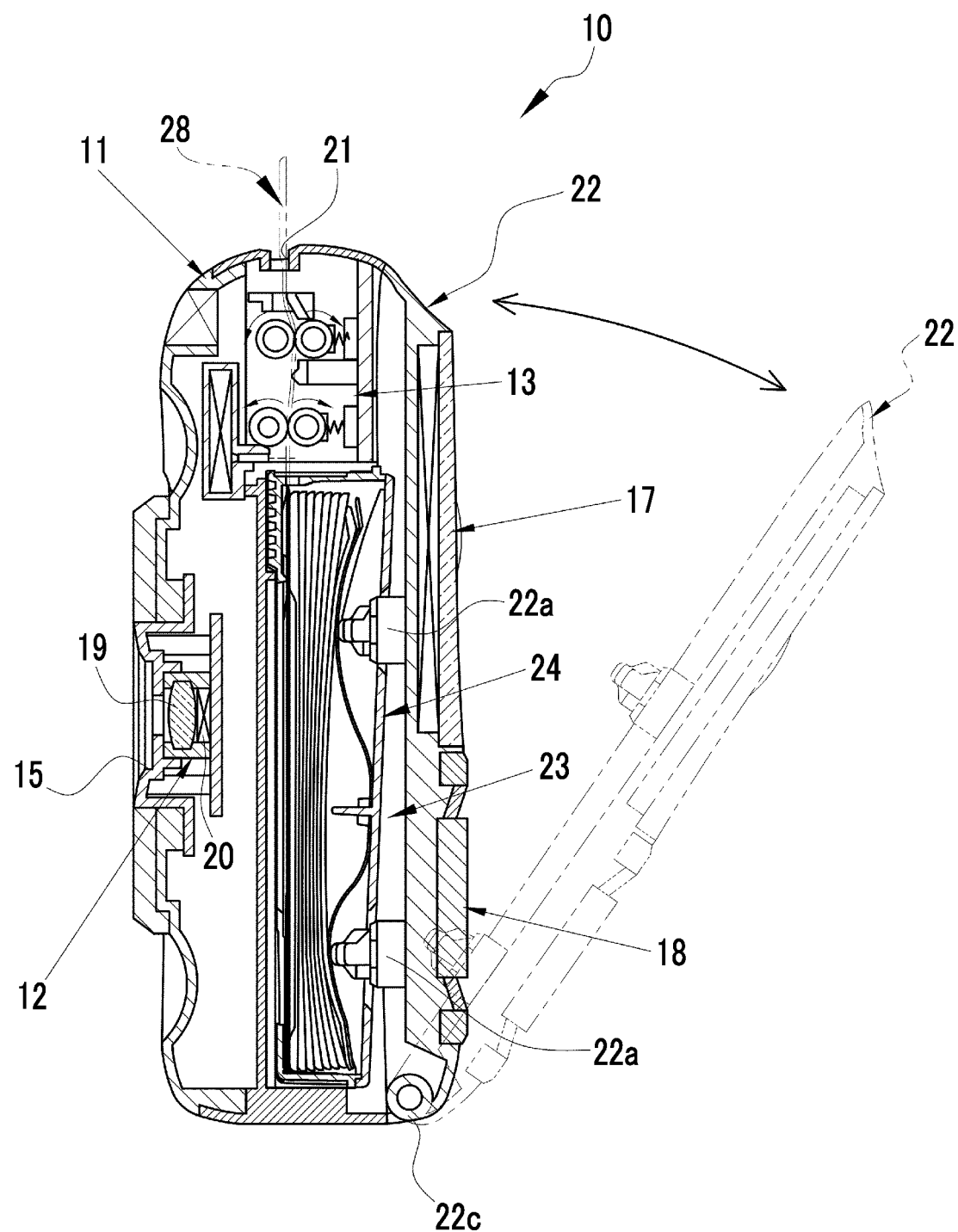
FIG. 2 is a longitudinal cross-sectional view of a center of the digital camera including a printer.

As shown in FIG. 2, the imaging optical system 19 and a solid-state imaging element 20 are provided in the imaging unit 12. For example, the solid-state imaging element 20 is a complementary metal-oxide-semiconductor (CMOS) image sensor, and includes a light receiving surface constituted by a plurality of pixels (not shown) arrayed in a two-dimensional matrix shape. Each pixel includes a photoelectric conversion element, photoelectrically converts a subject image formed on the light receiving surface by the imaging optical system 19, and generates an imaging signal.

The solid-state imaging element 20 comprises signal processing circuits (all not shown) such as a noise removal circuit, an auto gain controller, and an A/D conversion circuit. The noise removal circuit performs noise removal processing on the imaging signal. The auto gain controller amplifies a level of the imaging signal to an optimum value. The A/D conversion circuit converts the imaging signal into a digital signal, and outputs the digital signal to a built-in memory (not shown) from the solid-state imaging element 20. An output signal of the solid-state imaging element 20 is image data (so-called RAW data) having one color signal for each pixel.

The solid-state imaging element 20 is driven by pressing at least one of the release switch 16A or 16B, and the subject image is imaged.

A film feeding port 21 is provided on a top surface of the camera body 11. The instant film 28 on which an image has been printed is discharged from the film feeding port 21.

Figure 3:
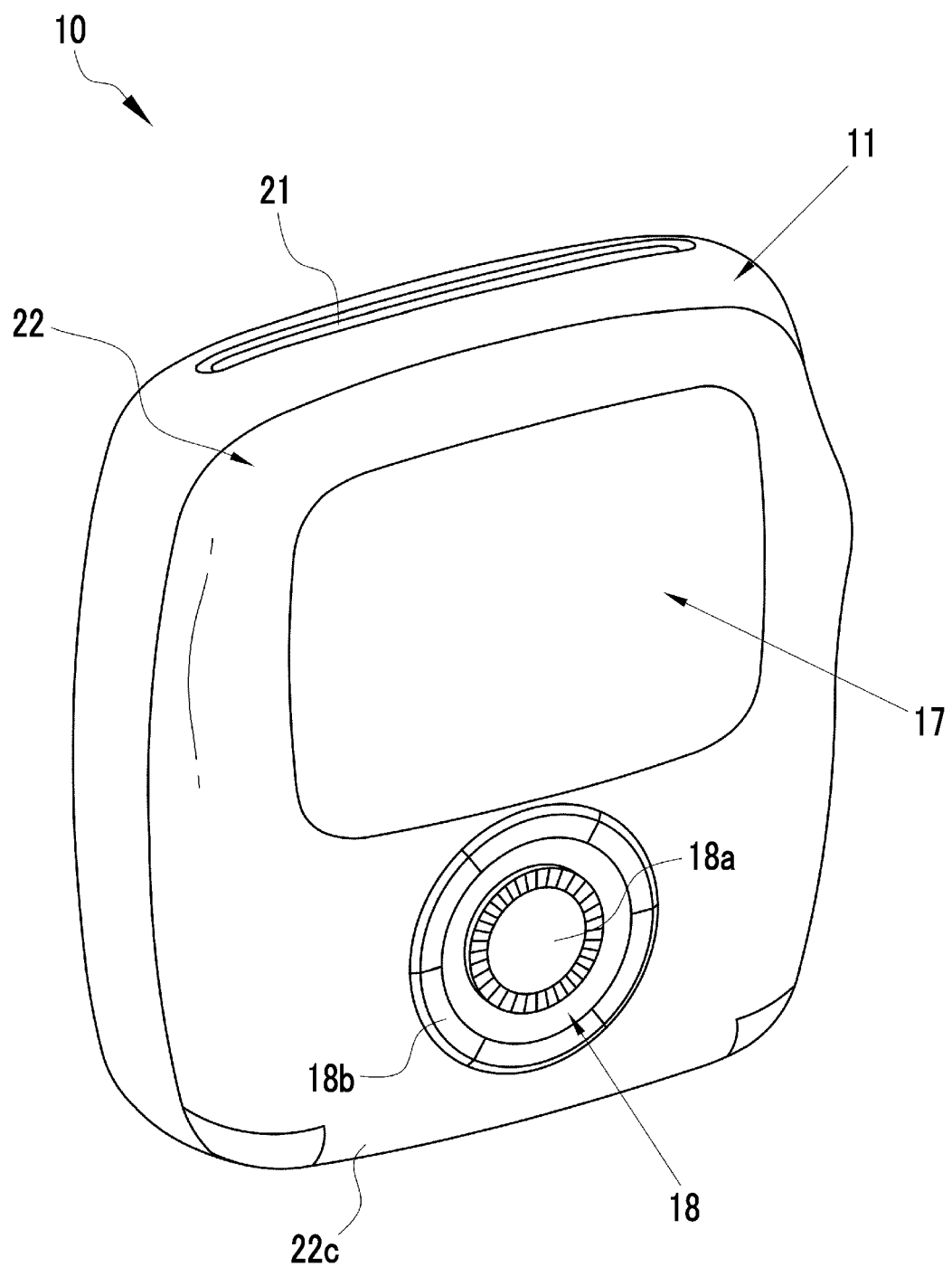
FIG. 3 is a rear perspective view of the digital camera including a printer with a loading lid in a closed position.

As shown in FIG. 3, a loading lid 22 is attached to a rear surface side of the camera body 11 through a hinge portion 22c. The hinge portion 22c rotatably supports the loading lid 22 between an opened position (state shown in FIG. 4) and a closed position (state shown in FIG. 3). The loading lid 22 opens a film pack room 23 within the camera body 11 in the opened position. The loading lid 22 covers the film pack room 23 in the closed position. A locking mechanism and an unlocking mechanism (all not shown) are provided between the camera body 11 and the loading lid 22, and in a case where the locking mechanism holds the loading lid 22 in the closed position and operates the unlocking mechanism, the loading lid 22 moves rotationally from the closed position to the opened position.

Figure 4:
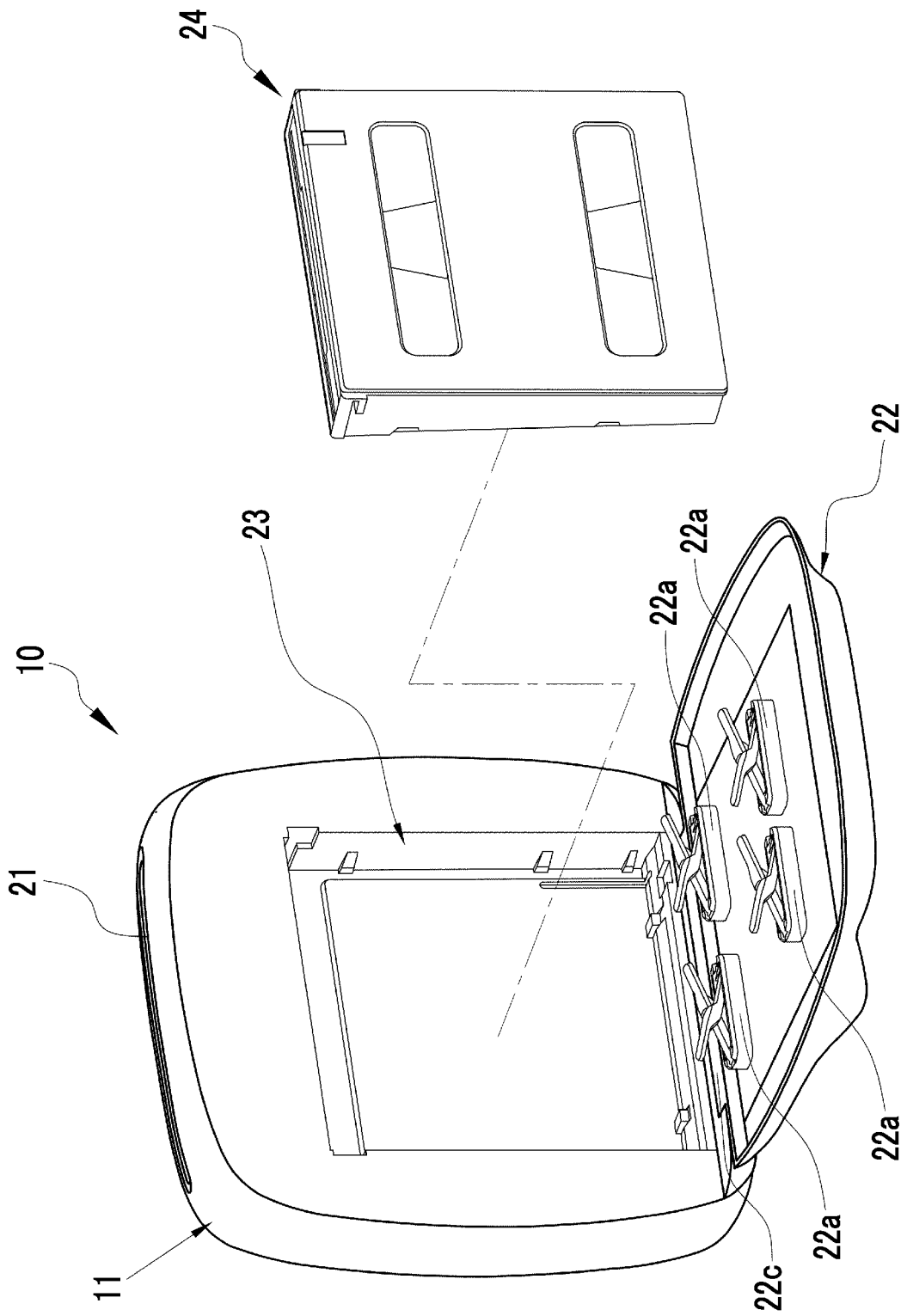
FIG. 4 is a rear perspective view of the digital camera including a printer with the loading lid in an opened position.

As shown in FIG. 4, an instant film pack 24 accommodating the instant film 28 is loaded into a film pack room 23 (loading room). A user loads the instant film pack 24 in which the instant film 28 is accommodated into the film pack room 23. A plurality of film holding portions 22a are provided on an inner surface of the loading lid 22.

A rear display unit 17 and an operating part 18 are provided on an outer surface of the loading lid 22, that is, a rear surface of the camera body 11. The rear display unit 17 is, for example, a liquid crystal display (LCD) panel. Image data items corresponding to one frame output from the solid-state imaging element 20 are sequentially input into the rear display unit 17, and are displayed as a live preview image.

A photographer presses at least one of the release switch 16A or 16B, and thus, imaging is started. Image data items are acquired from the solid-state imaging element 20 through the imaging. An image processing unit (not shown) performs known image processing on the image data items, and then the image data items are compressed. Examples of the image processing include matrix operation, demosaicing, γ correction, luminance conversion, color difference conversion, and resizing. The image data items on which the image processing and the compression are performed are recorded in a built-in memory (not shown) such as a flash memory provided within the camera body 11.

In a case where a menu switch 18a of the operating part 18 is pressed, the image is played and displayed on the rear display unit 17 based on the image data items recorded in the built-in memory. In a case where an image desired to be printed is displayed on the rear display unit 17, the photographer presses a print switch 18b of the operating part 18, and thus, printing processing by the printer unit 13 is started.

[Configuration of Instant Film Pack]

Figure 5:
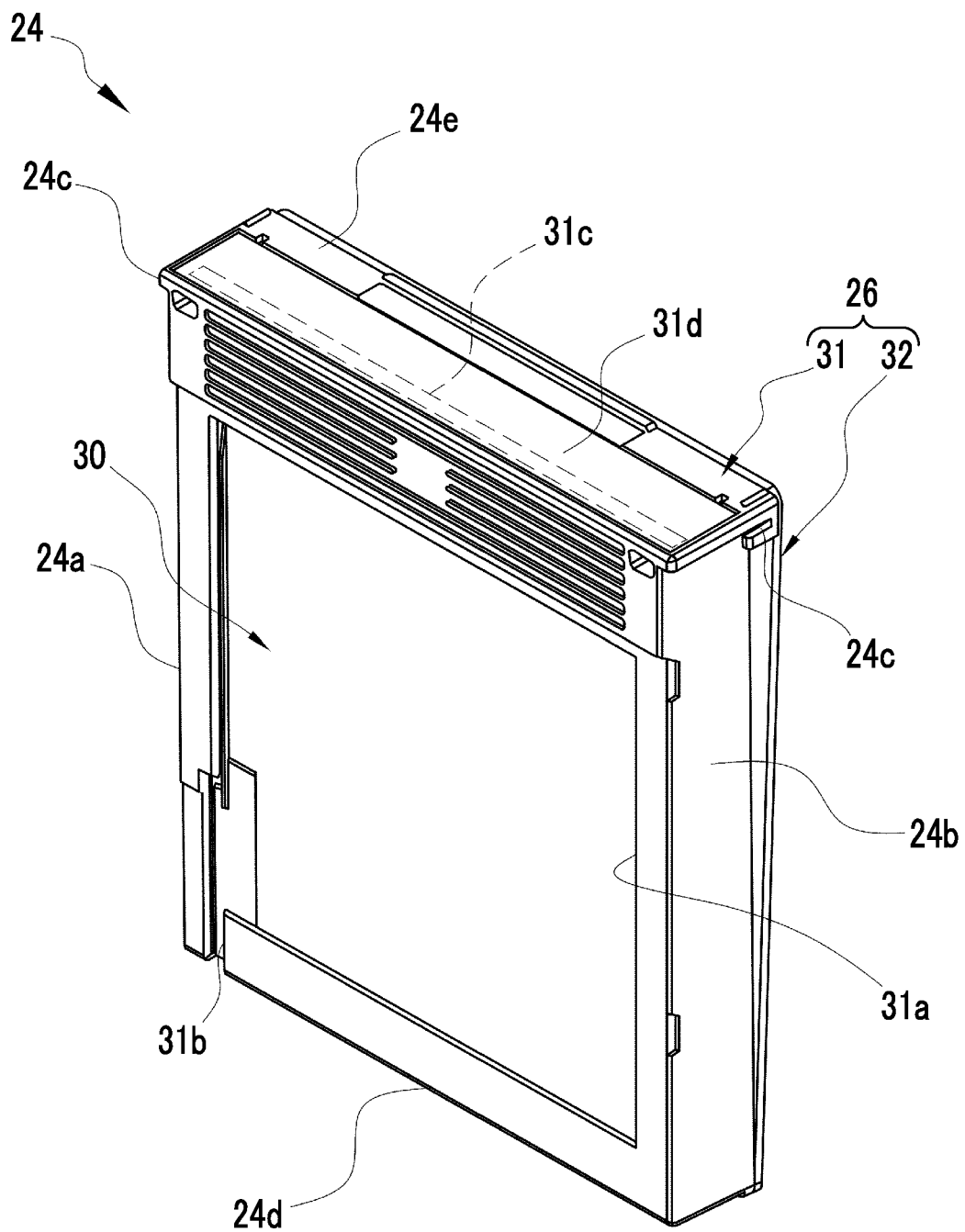
FIG. 5 is a perspective view of an instant film pack.
Figure 6:
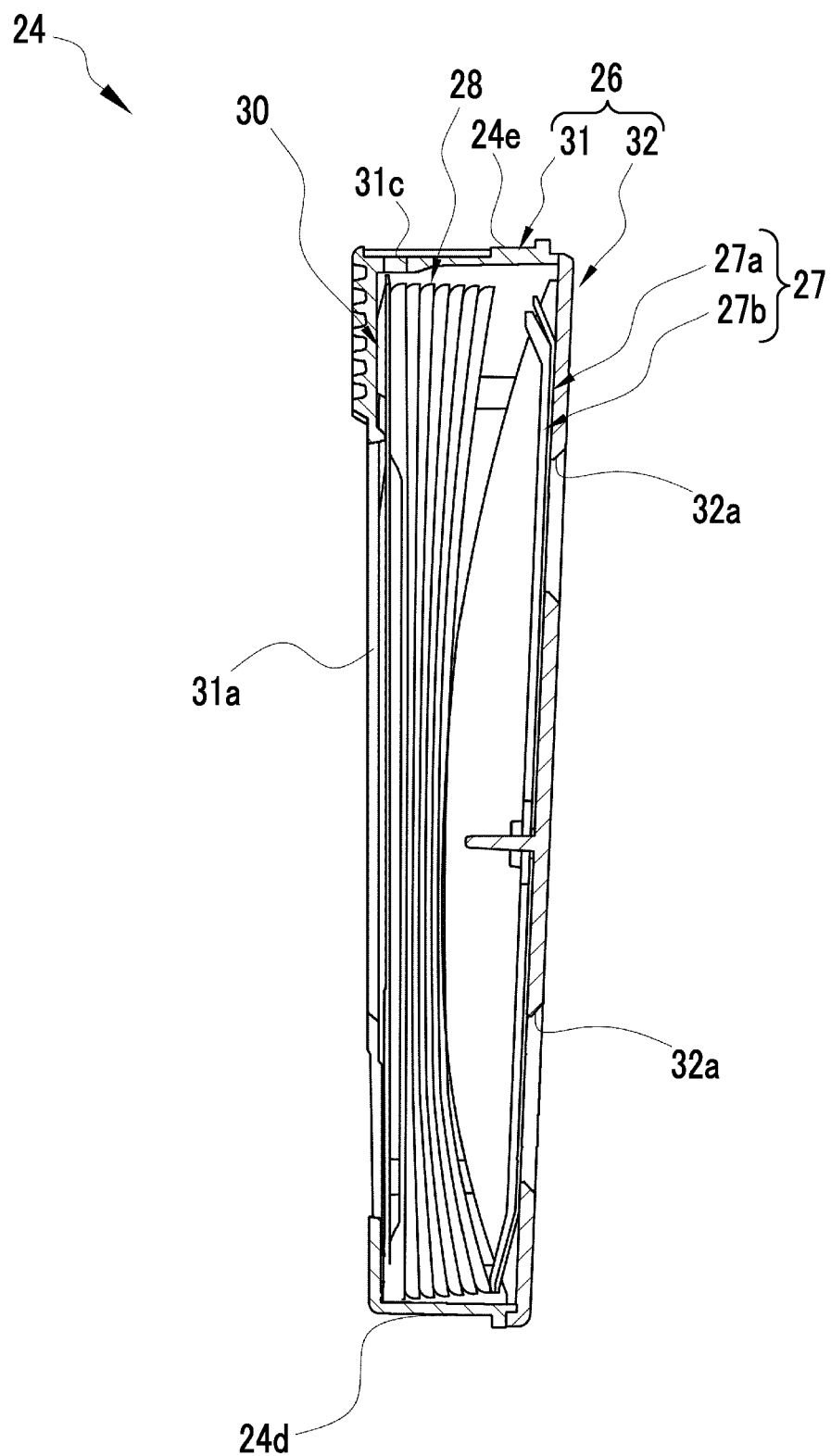
FIG. 6 is a cross-sectional view of the instant film pack.

As shown in FIGS. 5 and 6, the instant film pack 24 comprises a case 26, a film press plate 27, a plurality of instant films 28, and a film cover 30.

As shown in FIG. 6, the case 26 accommodates the plurality of instant films 28 and one film cover 30 in a stacking manner. The case 26 is made of a material such as a thermoplastic resin or a paper resin acquired by mixing the thermoplastic resin with cellulose. The case 26 includes a box-shaped case member 31, and a lid 32 that covers an opening formed in a rear surface side of the case member 31.

Figure 7:
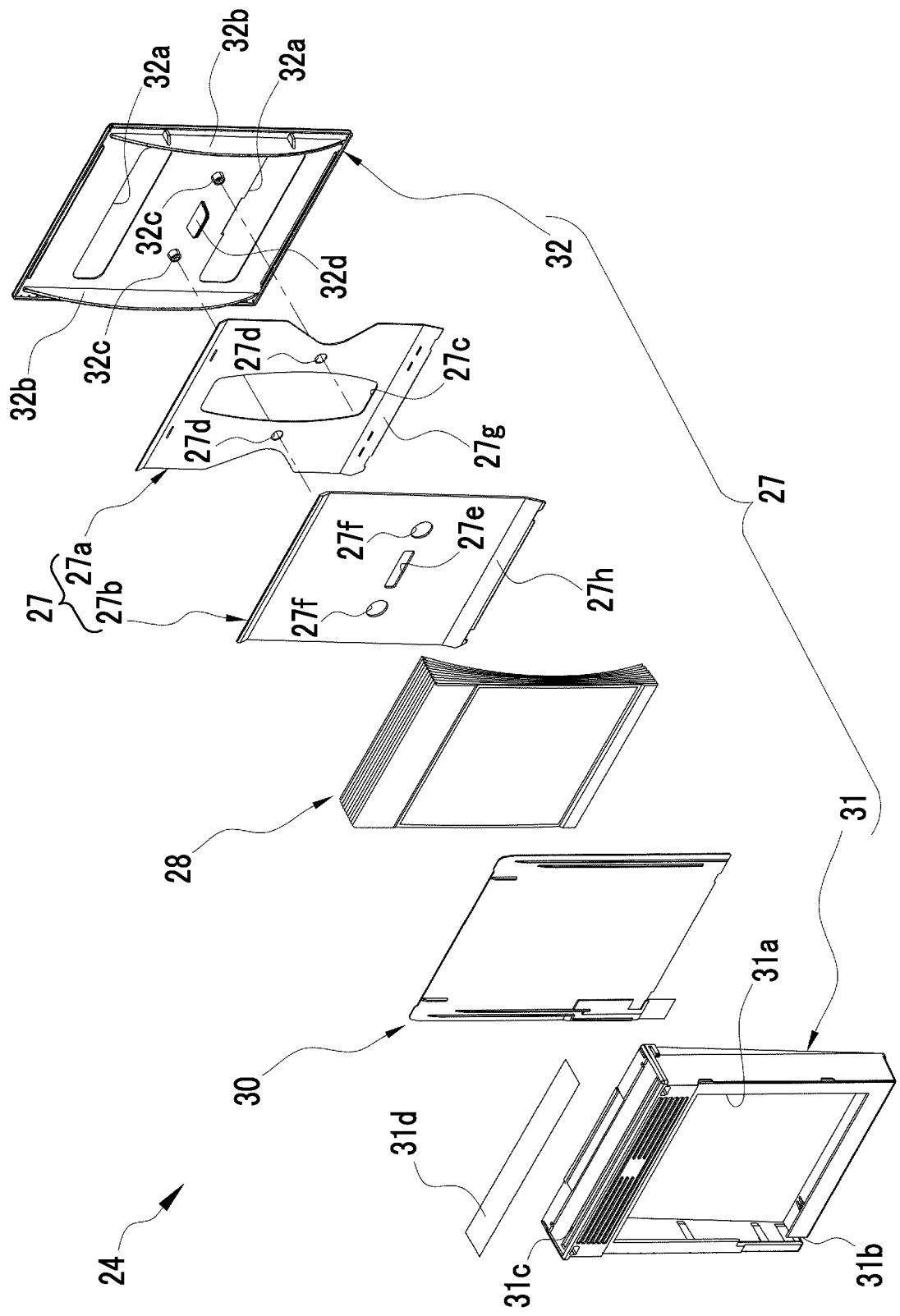
FIG. 7 is an exploded perspective view of the instant film pack.

As shown in FIG. 7, an exposure aperture 31a for exposing the instant film 28 is formed in the case member 31. In the following description, a surface of the instant film pack 24 in which the exposure aperture 31a is formed is a "front surface", a surface opposite to the "front surface" is a "rear surface", a surface facing the film feeding port 21 of the camera body 11 is a "top surface", and a surface opposite to the "top surface" is a "bottom surface". The film cover 30 is overlapped before the instant film 28 positioned in a foremost layer initially set in the exposure aperture 31a within the case member 31. Accordingly, the exposure aperture 31a is light tightly blocked by the film cover 30. A cut-off portion 31b into which a known claw member 57 (see FIGS. 9 and 10) formed at the camera is inserted is formed in a lower portion of the exposure aperture 31a.

A feeding port 31c is formed on a top surface of the case member 31. The feeding port 31c is formed in a slit shape. The instant films 28 or the film cover 30 are fed one by one outwards from the instant film pack 24 by the claw member 57 inserted into the cut-off portion 31b of the case member 31 through the feeding port 31c.

A light shielding seal 31d is pasted onto the case member 31 so as to close the feeding port 31c from the outside. The light shielding seal 31d is formed as a flexible sheet. The light shielding seal 31d is pasted onto only one edge of a long side of the feeding port 31c so as not to hinder the instant film 28 or the film cover 30 when the instant film or the film cover passes through the discharge port 31c.

As shown in FIG. 7, the lid 32 includes a pair of openings 32a, a pair of unit support protrusions 32b, a pair of caulking pins 32c, and a support piece 32d. The pair of openings 32a are formed so as to be vertically spaced apart from each other by a predetermined interval, and serve as an entrance into which the film holding portions 22a provided in the digital camera 10 including a printer are inserted when the digital camera 10 including a printer is loaded.

The pair of unit support protrusions 32b are provided at both side edge portions of the lid 32 so as to be vertically long, and each has an arc shape of which a center portion protrudes toward the exposure aperture 31a. The unit support protrusions 32b touch both side edge portions on a rear surface of the instant film 28 positioned in a last layer, and push up the instant film 28 by each having the arc shape of which the center portion protrudes toward the exposure aperture 31a. Accordingly, a gap between the film cover 30 and the exposure aperture 31a is prevented from being formed.

The pair of caulking pins 32c are used for attaching the film press plate 27. The support piece 32d supports a center portion of the instant film 28 positioned in the last layer from behind, and prevents the instant film 28 from being curved in a direction in which the center portion is curved toward the lid 32.

The film press plate 27 includes two elastic sheets 27a and 27b made of a synthetic resin. The sheet 27a is pressed by the plurality of film holding portions 22a when the loading lid 22 is closed, and is curved so as to protrude toward the lid 32. An opening 27c and a pair of holes 27d are formed in the sheet 27a. The opening 27c is formed in a center portion of the sheet 27a so as to be vertically long, and the support piece 32d is inserted into this opening. The pair of caulking pins 32c are inserted into the pair of holes 27d, and the pair of holes are used for attaching the film press plate 27 to the lid 32.

An opening 27e and a pair of holes 27f are formed in the sheet 27b. The opening 27e is formed in a center portion of the sheet 27a, and the support piece 32d is inserted into this opening. The pair of caulking pins 32c are inserted into the pair of holes 27f. A lower end portion 27h of the sheet 27b is attached to a lower end portion 27g of the sheet 27a. Accordingly, the sheet 27b prevents the sheet 27a from being slack, and prevents light leak from the pair of openings 32a. The sheet 27b pushes up the instant film 28 in a substantially planar manner when the sheet 27a is elastically bent by the plurality of film holding portions 22a. As a result, the film cover 30 positioned in the foremost layer or the instant film 28 is pressed to the back side of the front surface of the case member 31.

L-shaped protrusions 24c are provided on both side surfaces 24a and 24b of the instant film pack 24. The protrusions 24c are protrusions provided to prevent the instant film pack 24 from being reversely loaded.

[Configuration of Instant Film]

Figure 8:
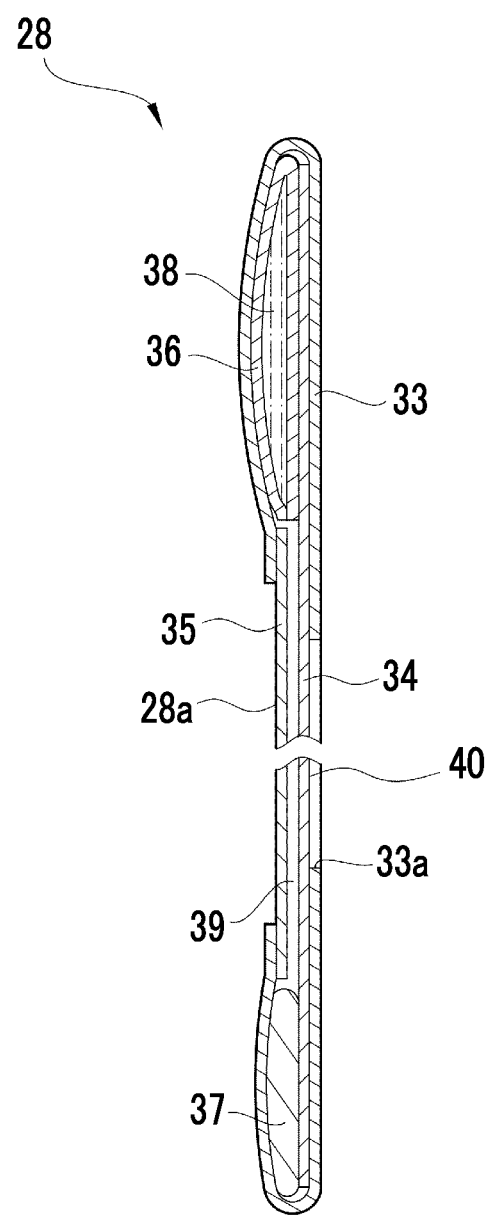
FIG. 8 is a cross-sectional view of the instant film.

As shown in FIG. 8, the instant film 28 includes a mask sheet 33, a photosensitive sheet 34, a cover sheet 35, a developer pod 36, and a trap portion 37, and is a so-called mono-sheet type film. The mask sheet 33 is formed as a sheet made of a thin synthetic resin, and comprises a screen opening 33a. A photosensitive layer, a diffusion reflective layer, an image receiving layer, and the like are provided in the photosensitive sheet 34. The cover sheet 35 includes an exposure surface 28a facing an exposure head 51 to be described below.

The developer pod 36 is formed in a substantially bag shape, and contains a developer 38 therein. The developer pod 36 is pasted onto an end portion of the photosensitive sheet 34 close to the feeding port 31c, and is wrapped by an end portion of the mask sheet 33. The trap portion 37 is pasted onto an end portion of the photosensitive sheet 34 opposite to the feeding port 31c, and is similarly wrapped by the end portion of the mask sheet 33.

As will be described in detail later, the photosensitive layer of the instant film 28 is irradiated with print light at the time of printing, and thus, the photosensitive layer is exposed. The developer pod 36 is torn at the time of development, and the developer 38 flows and is spread into a gap 39 between the photosensitive sheet 34 and the cover sheet 35. An image acquired through the exposure of the photosensitive layer is reversed by the diffusion reflective layer, and is transferred to the image receiving layer. By doing this, a positive image appears on a positive image observation surface 40 of the photosensitive sheet 34 exposed through the screen opening 33a.

The film cover 30 is formed as a sheet thinner than the instant film 28, and has light shielding properties and flexibility. The film cover 30 is a molded item made of a synthetic resin, and is made, for example, of polystyrene containing carbon black. That is, the film cover 30 has rigidity higher than the instant film 28. In a case where the instant film pack 24 is loaded into the film pack room 23 and is used, the film cover 30 is discharged to the film discharge port 21 by a spreading roller pair 54 (see FIGS. 9 and 10) to be described later.

[Configuration of Printer Unit]

Figure 9:
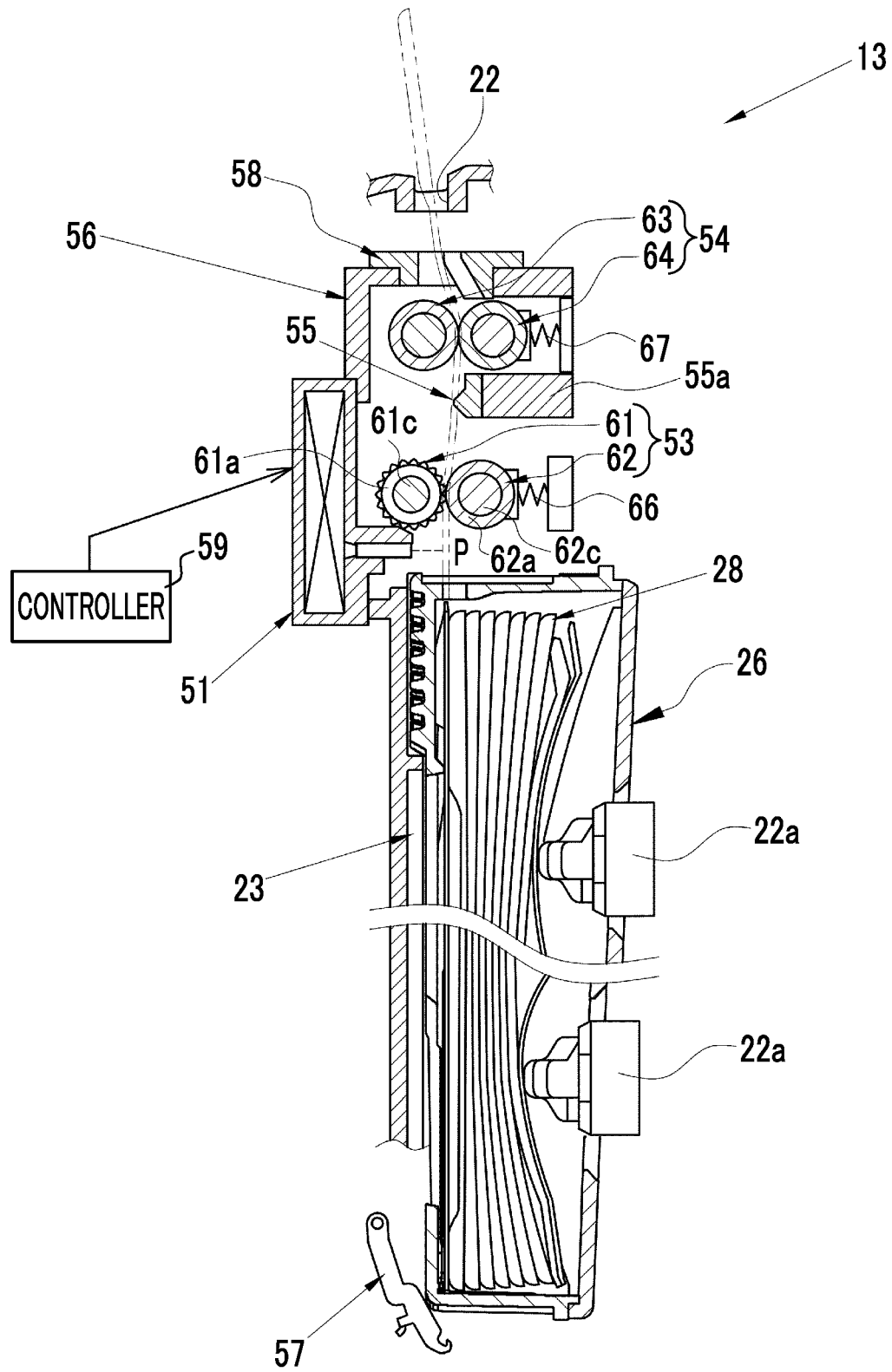
FIG. 9 is a cross-sectional view of a printer unit.
Figure 10:
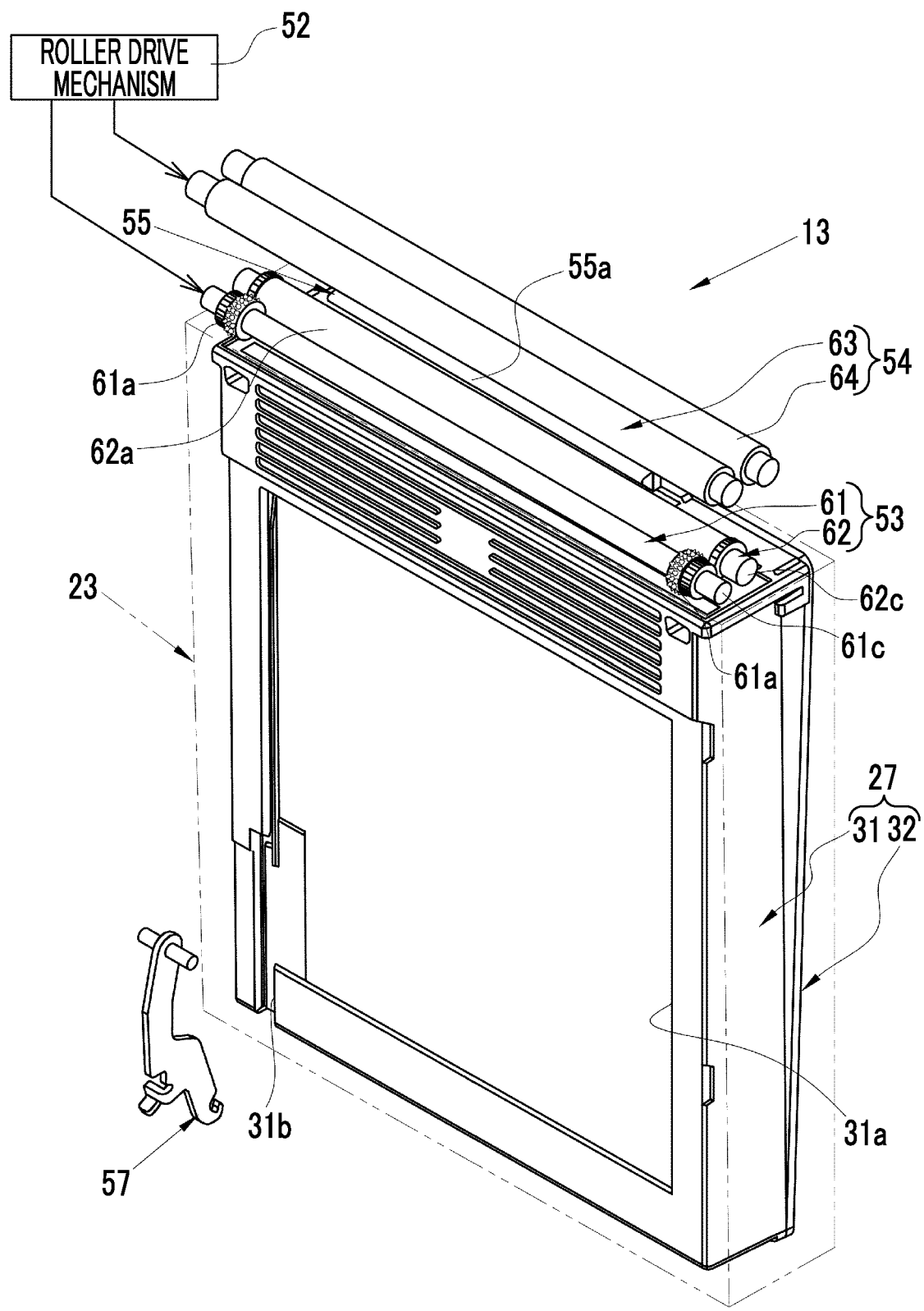
FIG. 10 is a perspective view of the printer unit in which a device housing is omitted.
Figure 11:
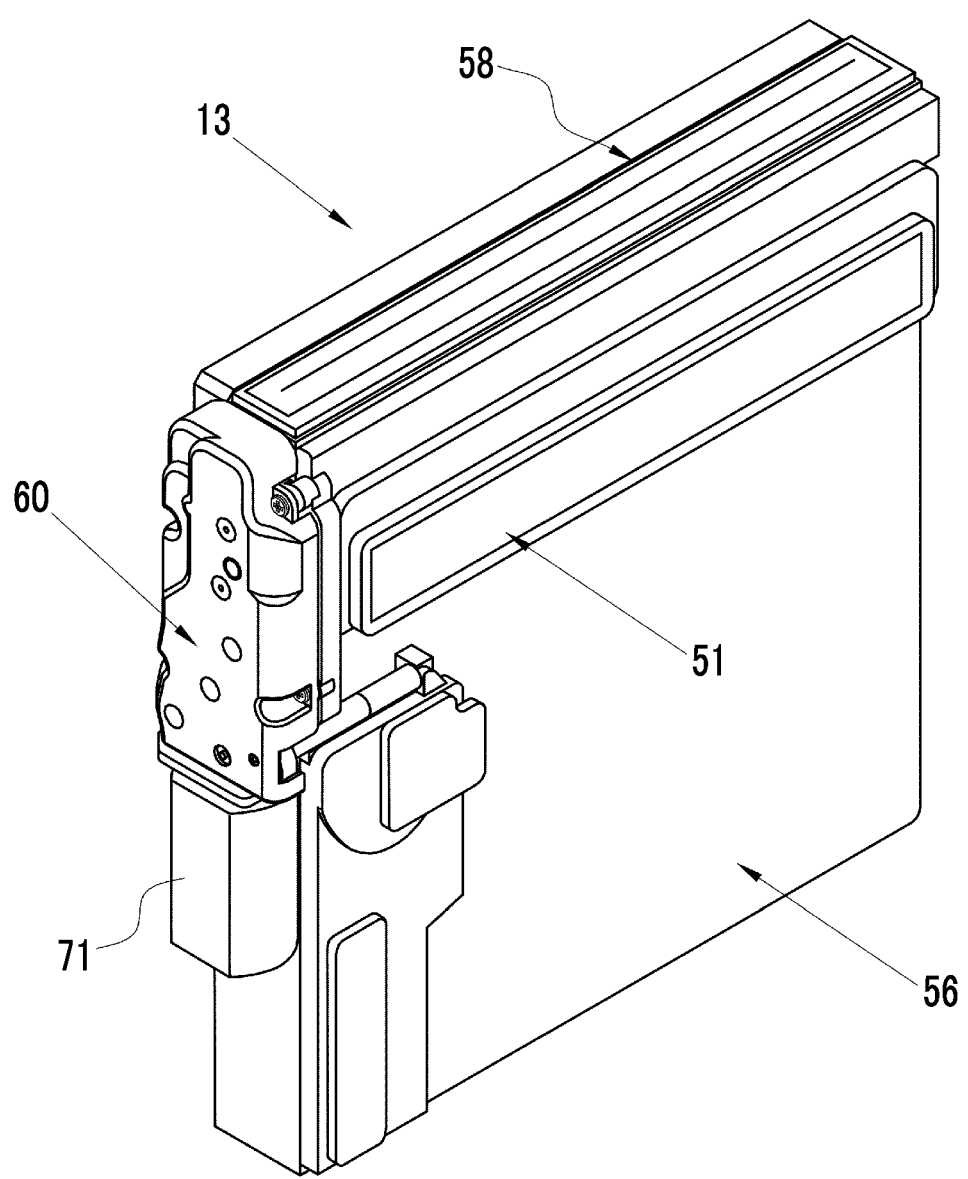
FIG. 11 is a perspective view of the printer unit.
Figure 12:
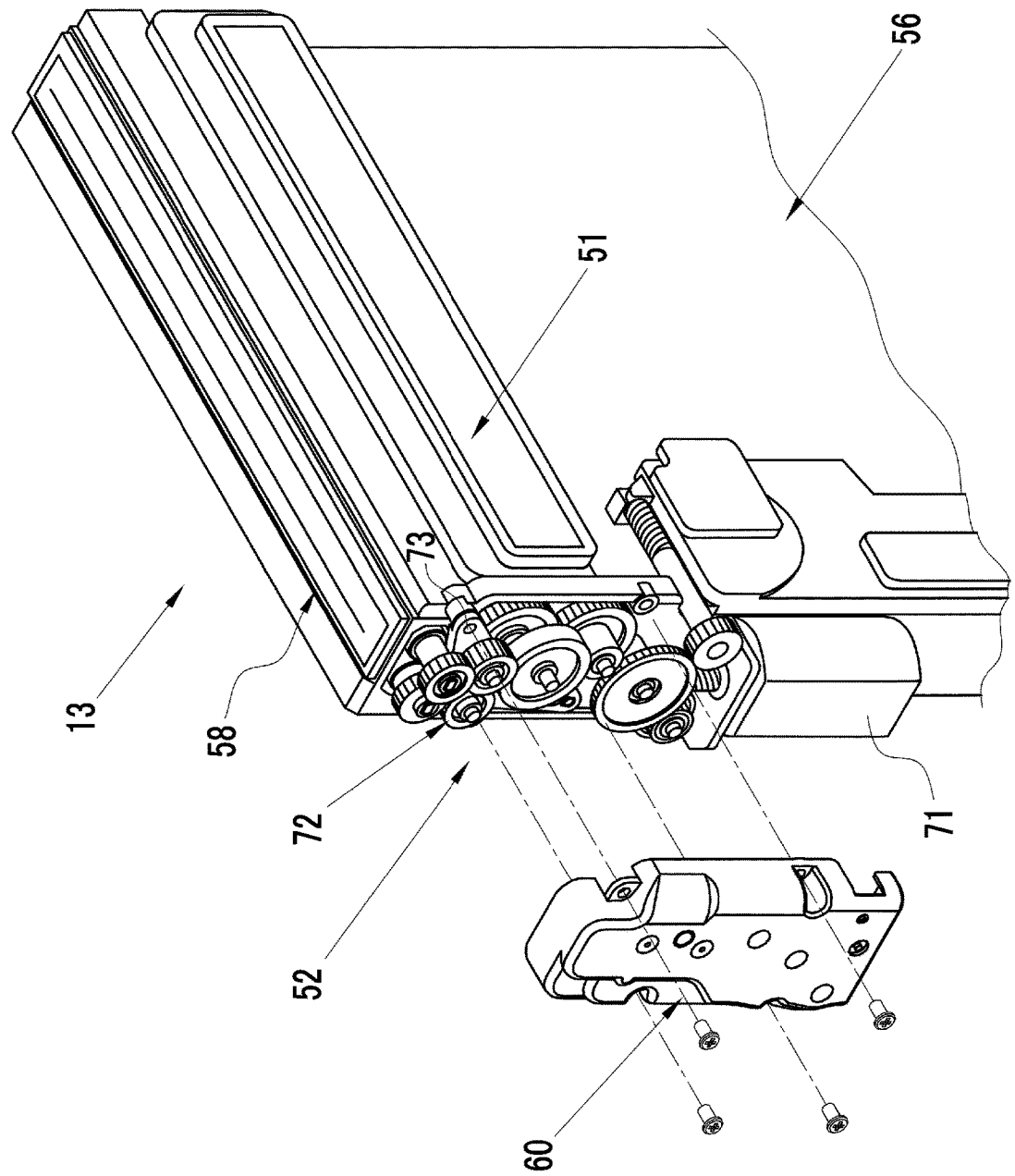
FIG. 12 is an exploded perspective view of the printer unit.

As shown in FIGS. 9 and 10, the printer unit 13 includes the exposure head 51, a roller drive mechanism 52, a transport roller pair 53, the spreading roller pair 54, a spreading control member 55, a device housing 56 (sees FIGS. 11 and 12), the claw member 57, a claw member drive mechanism (not shown), a discharge guide 58, a controller 59, and a cover member 60 (see FIGS. 11 and 12). The printer unit 13 corresponds to a printer within the scope of the claims.

In FIG. 10, although the device housing 56, the cover member 60, and the like are omitted in order to avoid complication, in reality, the printer unit 13 is constituted by attaching the exposure head 51, the roller drive mechanism 52, the transport roller pair 53, the spreading roller pair 54, the spreading control member 55, the claw member 57, the claw member drive mechanism, the cover member 60, and the like to the device housing 56 as shown in FIGS. 11 and 12.

Hereinafter, a transport direction in which the transport roller pair 53 transports the instant film 28 is a Y direction, a width direction of the instant film 28 orthogonal to the Y direction is an X direction, and a direction orthogonal to the X direction and the Y direction is a Z direction.

[Configuration of Device Housing]

Figure 13:
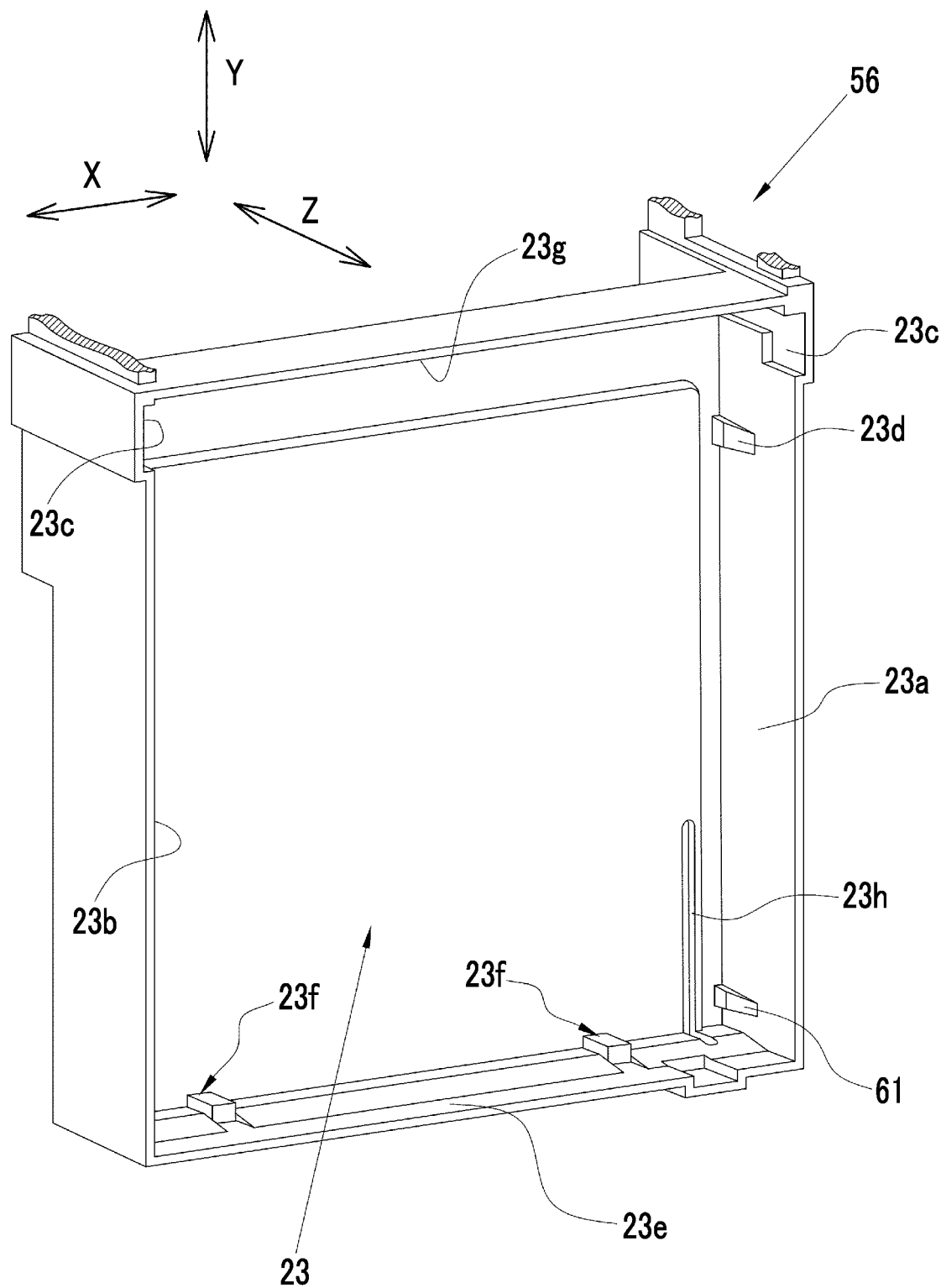
FIG. 13 is a perspective view of the device housing.

As shown in FIG. 13, the device housing 56 is formed in a box shape in which the rear surface side of the camera body 11 is opened, and the film pack room 23 is integrally provided. In addition to the film pack room 23, the device housing 56 has a frame portion that supports the exposure head 51, the roller drive mechanism 52, the transport roller pair 53, the spreading roller pair 54, the claw member 57, the cover member 60, and the like, but these components are omitted in FIG. 13. The device housing 56 and the cover member 60 are made of a resin material, and are preferably, for example, a polycarbonate resin, and more preferably a glass fiber reinforced polycarbonate resin containing 20% of glass fibers.

L-shaped cut-off portions 23c are formed on both side surfaces 23a and 23b of the film pack room 23. The L-shaped cut-off portions 23c prevent the instant film pack 24 from being reversely loaded by being fitted with the L-shaped protrusions 24c provided on both the side surfaces 24a and 24b of the instant film pack 24.

Positioning protrusions 23d for positioning the instant film pack 24 in the X direction are provided in the film pack room 23. The positioning protrusions 23d are formed in a wedge shape in which a thickness gradually increases in the Z direction, that is, in a front-rear direction of the camera body 11.

Elastic members 23f that perform positioning in the Y direction are provided on a bottom surface 23e of the film pack room 23. The elastic member 23f is a cuboid member made of sponge or rubber. An elastic force in a case where the elastic members 23f try to return from a compressed state to an uncompressed state acts, and a top surface 24e of the instant film pack 24 is pressed against a top surface 23g of the film pack room 23. The top surface 23g of the film pack room 23 has an opening portion connected to the transport roller pair 53.

The film pack room 23 comprises a cut-off portion 23h. The claw member 57 enters the inside of the instant film pack 24 through the cut-off portion 23h, and the instant films 28 are fed one by one outwards from the instant film pack 24.

As described above, the instant film pack 24 is positioned in the X direction and the Y direction with respect to the film pack room 23, and is further positioned in the Z direction by positioning the loading lid 22 in the closed position. Specifically, the plurality of film holding portions 22a provided at the loading lid 22 are positioned in the Z direction with respect to the instant film pack 24.

In a case where one of the instant film pack 24 is loaded into the film pack room 23 and the loading lid 22 is positioned in the closed position, the plurality of film holding portions 22a pass through the openings 32a, are inserted into the instant film pack 24, and press the film press plate 27. Accordingly, the instant films 28 in the instant film pack 24 are pressed in a stacking direction.

As described above, the instant film pack 24 is loaded into the film pack room 23. An image is recorded on the instant film 28 discharged from the instant film pack 24 by the printer unit 13.

As shown in FIG. 9, the device housing 56 includes the transport roller pair 53 and the spreading roller pair 54. Specifically, a bearing unit (not shown) that pivotally supports the transport roller pair 53 and the spreading roller pair 54 is provided in the device housing 56.

[Configuration of Transport Roller Pair and Spreading Roller Pair]

Figure 14:
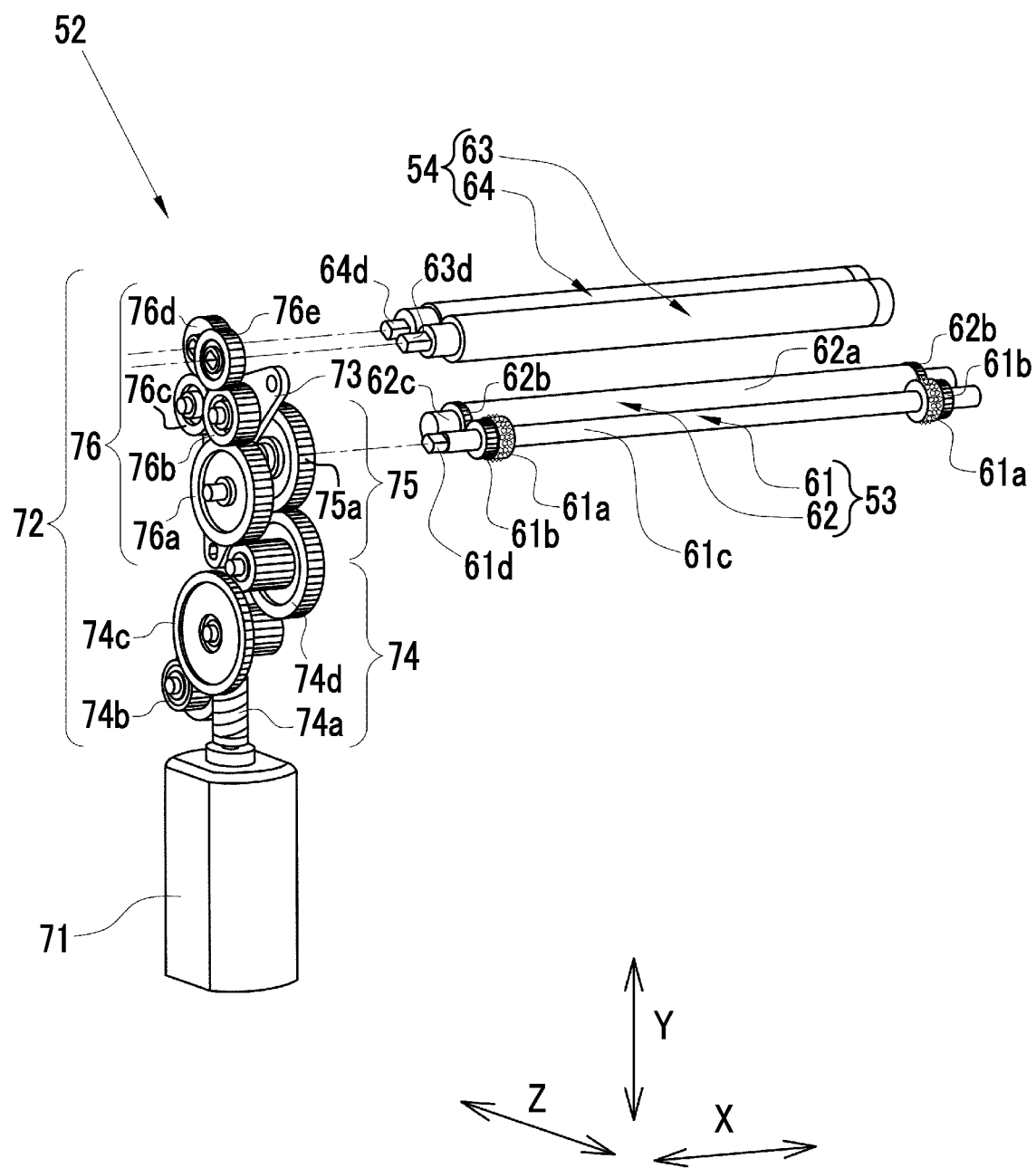
FIG. 14 is a perspective view of a roller drive mechanism.

As shown in FIG. 14, the transport roller pair 53 and the spreading roller pair 54 are driven to be rotated by the roller drive mechanism 52, and transport the film cover 30 and the instant film 28.

The transport roller pair 53 includes a capstan roller 61 and a pinch roller 62. The capstan roller 61 and the pinch roller 62 are disposed at positions at which these rollers pinch a transport passage of the instant film 28 (see FIG. 9). The capstan roller 61 is disposed on a side of the instant film 28 facing the exposure surface 28a. The capstan roller 61 includes a pair of columnar spike roller members 61a, a drive gear 61b, and a rotational shaft 61c that holds each spike roller member 61a and the drive gear 61b. A spike including a plurality of small protrusions is formed on a circumferential surface of the spike roller member 61a.

The pinch roller 62 is disposed on a side of the instant film 28 facing the positive image observation surface 40. The pinch roller 62 includes a roller member 62a, a drive gear 62b, and a rotational shaft 62c. Both end portions of the roller member 62a are supported so as to freely move by the device housing 56 within a thickness range of the instant film 28, and are pressed toward the capstan roller 61 by springs 66 as press mechanisms. Thus, the pinch roller 62 is elastically supported in a direction orthogonal to the transport direction of the instant film 28.

The drive gears 61b and 62b are provided at both end portions of the rotational shafts 61c and 62c and mesh with each other. A DC motor 71 is connected to one end of the rotational shaft 61c via a drive transmission gear train 72. Thus, in a case where the DC motor 71 rotates, the capstan roller 61 and the pinch roller 62 rotate in synchronization with each other.

The spreading roller pair 54 includes spreading rollers 63 and 64, and is disposed on a downstream side of the transport roller pair 53 in the transport direction. The spreading roller 63 is disposed on a side of the instant film 28 facing the exposure surface 28a. The spreading roller 64 is disposed on a side of the instant film 28 facing the positive image observation surface 40. Both end portions of the spreading roller 64 are supported so as to freely move within the thickness range of the instant film 28 by the device housing 56, and are pressed toward the spreading roller 63 by springs 67 (see FIG. 9) as press mechanisms. Thus, the spreading roller 64 is elastically supported in a direction orthogonal to the transport direction of the instant film 28.

Gears 76e and 76d constituting the drive transmission gear train 72 to be described later are connected to one of end portions of the spreading rollers 63 and 64. The DC motor 71 is connected to the drive transmission gear train 72. Thus, in a case where the DC motor 71 rotates, the spreading rollers 63 and 64 rotate in synchronization with each other.

The discharge guide 58 is disposed on the downstream side of the spreading roller pair 54 in the transport direction. The spreading roller pair 54 transports the instant film 28 transported by the transport roller pair 53 toward the discharge guide 58 in a state of pinching the instant film over the entire width. The instant film is sandwiched by the spreading roller pair 54, and thus, the developer pod 36 of the instant film 28 is crushed. Accordingly, the developer is spread (unfolded) into the gap 39 (see FIG. 8). The instant film 28 fed from the spreading roller pair 54 is transported toward the discharge guide 58.

The spreading control member 55 (see FIG. 9) is provided between the transport roller pair 53 and the spreading roller pair 54. The spreading control member 55 touches the positive image observation surface 40 of the transported instant film 28, and rubs the positive image observation surface 40 of the instant film 28. Thus, the spreading control member 55 that controls a distribution of developer being spread extends in a direction parallel to the width direction of the instant film 28 being transported and orthogonal to the transport direction of the instant film 28. The spreading control member 55 is formed integrally with a plate-shaped support member 55a, and is fixed to the device housing 56 via the support member 55a.

A distal end of the spreading control member 55 protrudes toward the instant film 28 from a sandwiching position at which the spreading roller pair 54 sandwiches the instant film 28 on a cross section which is orthogonal to the exposure surface 28a of the instant film 28 being transported and is in parallel with the transport direction. Accordingly, the spreading control member 55 can securely rub the positive image observation surface 40 of the instant film 28.

The transport roller pair 53 transports the instant film 28 fed from the instant film pack 24 by the claw member 57 toward the film discharge port 21. An exposure position P (see FIG. 9) at which the exposure head 51 exposes the instant film 28 to the print light is positioned between the feeding ports 31c of the instant film pack 24 and the transport roller pair 53. The exposure using the exposure head 51 is performed for a period during which the instant film is transported by the transport roller pair 53.

The controller 59 controls the exposure of the exposure head 51 based on the image data. The exposure by the exposure head 51 is performed by sequentially exposing line images on the instant film 28 while moving the instant film 28 for each line. Accordingly, an image corresponding to a single screen is exposed on the photosensitive layer of the instant film 28. The instant film 28 is subsequently transported toward the spreading roller pair 54 by the transport roller pair 53.

[Configuration of Roller Drive Mechanism]

As shown in FIG. 14, the roller drive mechanism 52 comprises the DC motor 71 as a drive source, the drive transmission gear train 72 that transmits a rotational driving force, and a gear plate 73. The drive transmission gear train 72 includes a first sub-gear train 74, a second sub-gear train 75, and a third sub-gear train 76. The first sub-gear train 74 transmits the rotational driving force from the DC motor 71 in the middle thereof. The first sub-gear train 74 includes a worm gear 74a pivotally supported on a rotational shaft of the DC motor 71, and gears 74b, 74c, and 74d that sequentially transmit the rotational driving force from the worm gear 74a.

The second sub-gear train 75 receives the transmission of the rotational driving force from the first sub-gear train 74 and transmits the rotational driving force to the capstan rollers 61 of the transport roller pair 53. The second sub-gear train 75 includes a gear 75a that rotates receiving the transmission of the rotational driving force from the gear 74d constituting the first sub-gear train 74. In the present embodiment, the second sub-gear train 75 includes one gear 75a, but the present invention is not limited thereto, and the second sub-gear train 75 may include a plurality of gears that sequentially transmit the rotational driving force from the gear 74d.

As shown in FIG. 15, one end portion 61d of the rotational shaft 61c of the capstan roller 61 is formed in a D-cut shape. One end portion 61d protrudes from the device housing 56 (see FIG. 16). The gear 75a includes a fitting hole 77. The one end portion 61d is fitted into the fitting hole 77, and thus, the gear 75a is connected to the rotational shaft 61c.

The third sub-gear train 76 receives the transmission of the rotational driving force from the first sub-gear train 74 and transmits the rotational driving force to the spreading roller pair 54. The third sub-gear train 76 includes a gear 76a that rotates by receiving the transmission of the rotational driving force from the gear 74d constituting the first sub-gear train 74, and gears 76b, 76c, 76d, and 76e that transmit the rotational driving force from the gear 76a.

In the spreading rollers 63 and 64, one end portions 63d and 64d of the rotational shaft are formed in a D-cut shape. The one end portions 63d and 64d protrude from the device housing 56 (see FIG. 16). The gears 76e and 76d include fitting holes 78a and 78b. The one end portions 63d and 64d are fitted into the fitting holes 78a and 78b, and thus, the gears 76e and 76d are connected to the spreading rollers 63 and 64.

Since the roller drive mechanism 52 transmits the rotational driving force from the DC motor 71 in the middle thereof by the first sub-gear train 74, and transmits the rotational driving force from the first sub-gear train 74 to the capstan roller 61 by the second sub-gear train 75, and transmits the rotational driving force from the first sub-gear train to the spreading rollers 63 and 64 by the third sub-gear train 76, the rotational driving force from the DC motor 71 is transmitted to the capstan roller 61 via the second sub-gear train 75. On the other hand, the rotational driving force from the DC motor 71 is transmitted to the spreading rollers 63 and 64 via the third sub-gear train 76. As described above, a path of the rotational driving force transmitted between the capstan roller 61 and the spreading rollers 63 and 64 is different.

On the other hand, in consideration of miniaturization and space saving of the roller drive mechanism 52, the second sub-gear train 75 and the third sub-gear train 76 are disposed at positions different from each other in the X direction and at least a part thereof overlaps in the Y direction and the Z direction. Accordingly, it is preferable that the second sub-gear train 75 and the third sub-gear train 76 are pivotally supported by separate members such that reaction forces are not influenced on each other.

Figure 16:
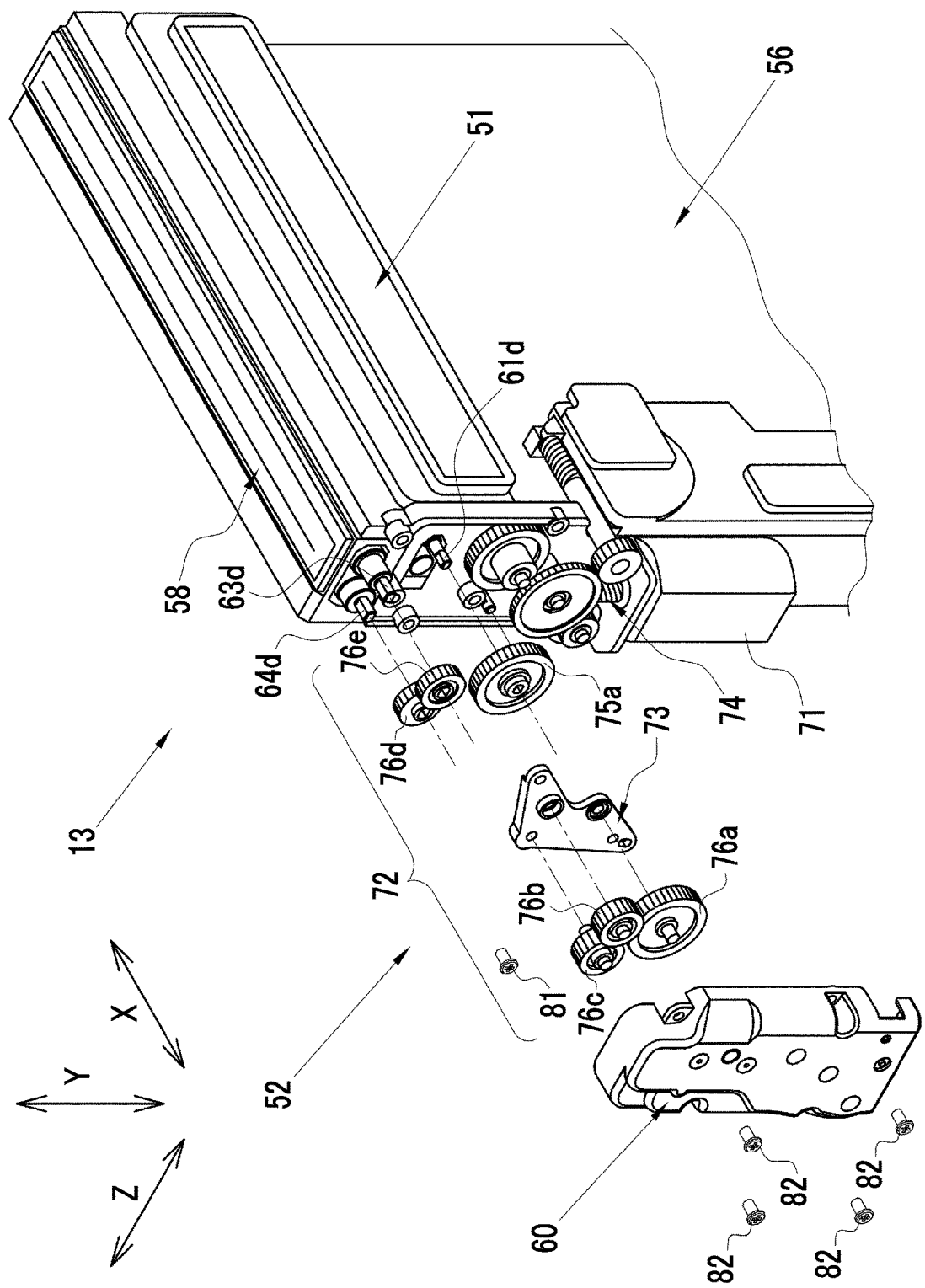
FIG. 16 is an exploded perspective view showing a configuration of an edge part of the roller drive mechanism.

Therefore, as shown in FIG. 16, the gear 75a of the second sub-gear train 75 is pivotally supported by the device housing 56, and the gears 76a to 76c of the third sub-gear train 76 are pivotally supported by the gear plate 73 separate from the cover member 60. As described above, the gears 76e and 76d are pivotally supported by the spreading rollers 63 and 64. The first sub-gear train 74 is pivotally supported by the device housing 56.

Figure 17:
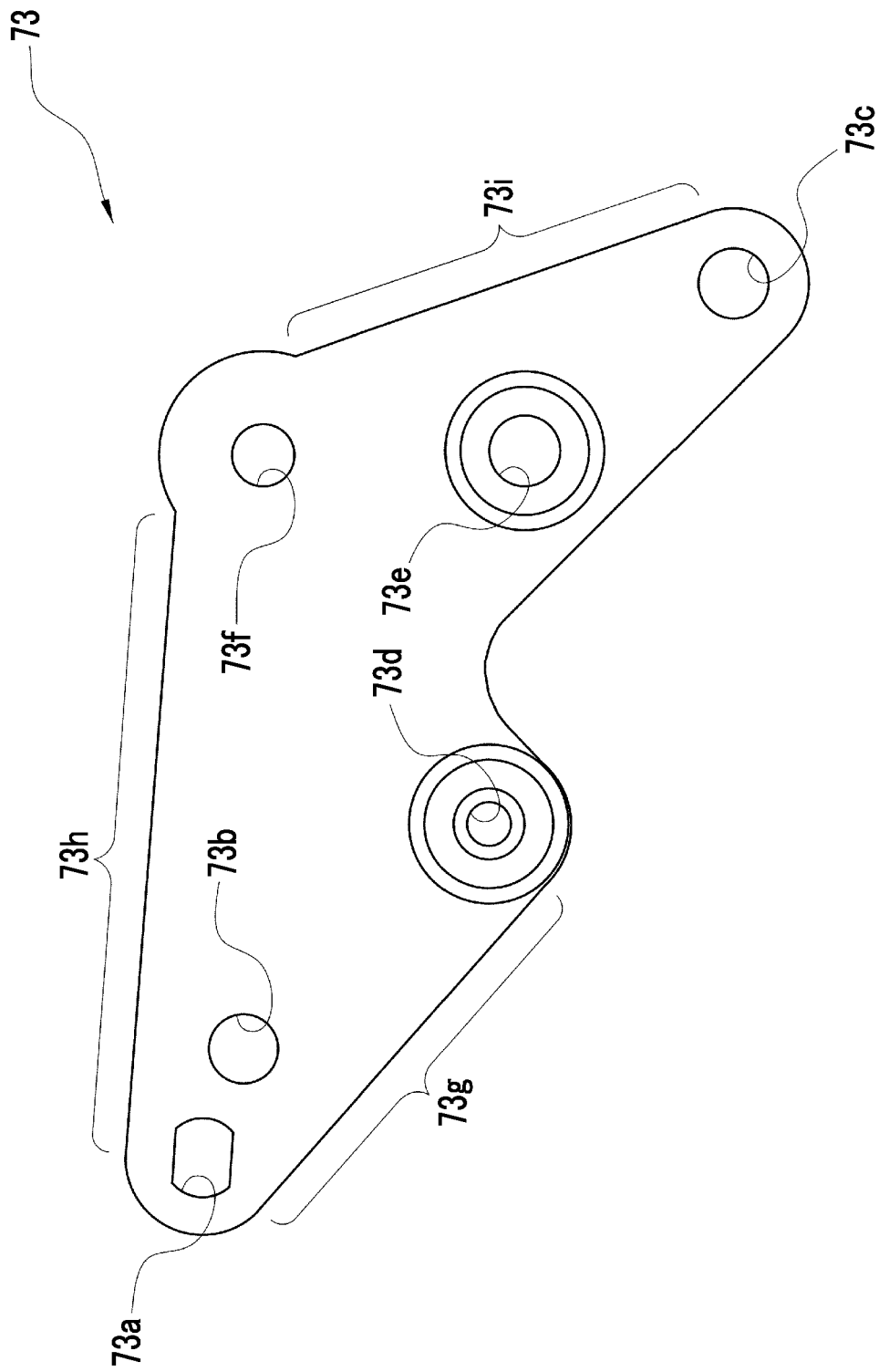
FIG. 17 is a plan view of a gear plate.

As shown in FIG. 17, the gear plate 73 includes a positioning hole 73a, fixing holes 73b and 73c, and support holes 73d, 73e, and 73f. The positioning hole 73a and the fixing holes 73b and 73c correspond to a fixing unit in the scope of the claims, and the support holes 73d, 73e, and 73f correspond to a bearing unit in the scope of the claims. Hereinafter, these positioning hole 73a, fixing holes 73b and 73c, and support holes 73d, 73e, and 73f are collectively referred to as reference holes.

Similarly to the device housing 56 and the cover member 60, the gear plate 73 is made of a resin material, and is preferably, for example, a polycarbonate resin, and more preferably a glass fiber reinforced polycarbonate resin containing 20% of glass fibers.

In the gear plate 73, a portion connecting the reference holes to each other is formed in a linear shape. That is, a portion 73g connecting the positioning hole 73a and the support hole 73d, a portion 73h connecting the positioning hole 73a and the support hole 73f, and a portion 73i connecting the fixing hole 73c and the support hole 73f are formed in a linear shape.

Figure 18:
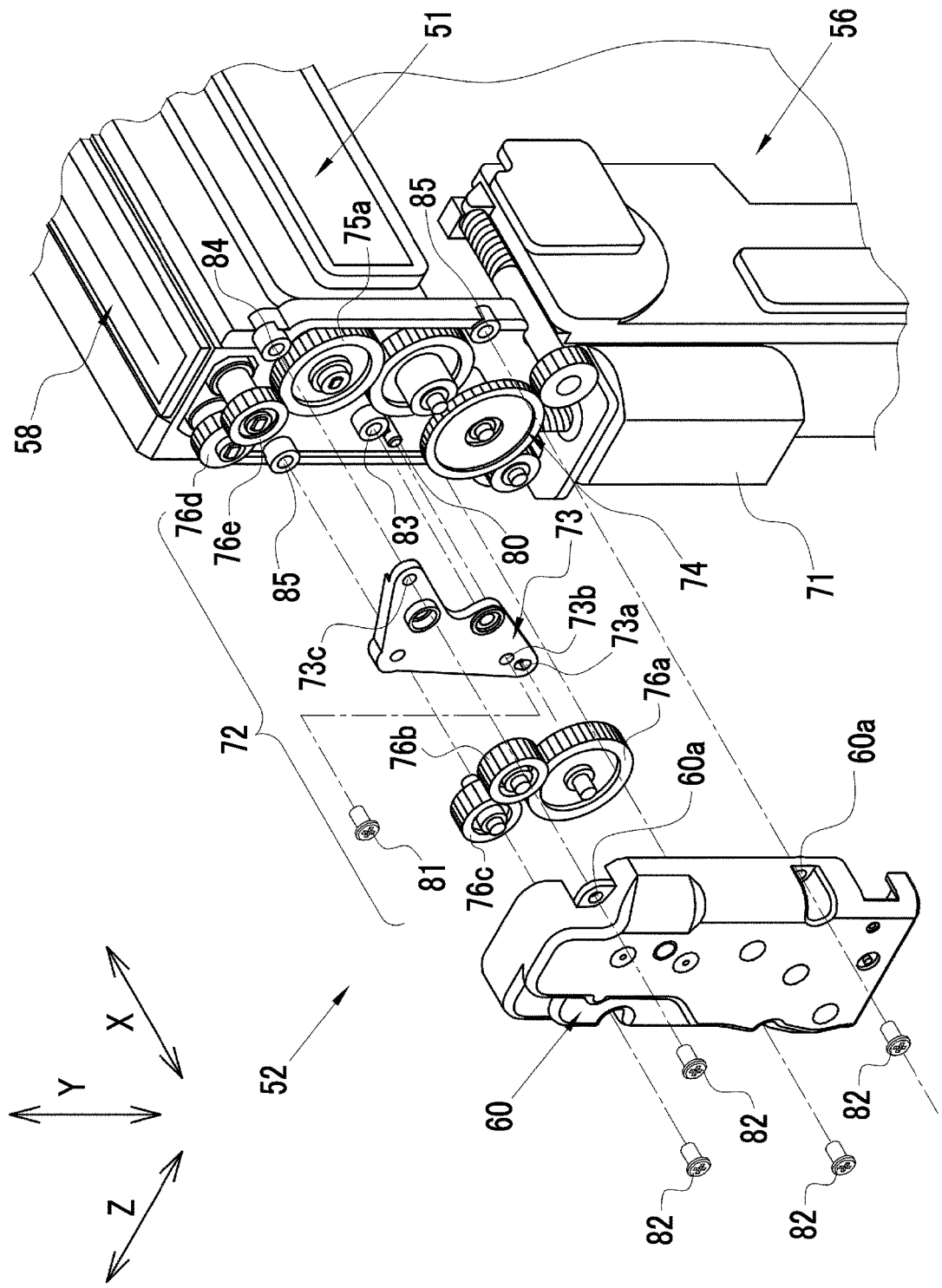
FIG. 18 is a perspective view showing a configuration of an edge part of a gear plate and a cover member.

As shown in FIG. 18, a positioning pin 80 is provided in the device housing 56. In the gear plate 73, the positioning pin 80 is fitted into the positioning hole 73a, and the gear plate 73 touches bosses of female screws 83 and 84 to be described later. Accordingly, the gear plate 73 is positioned in the X direction. The support holes 73d, 73e, and 73f are bearing units that pivotally support the rotational shafts of the gears 76a to 76c of the third sub-gear train 76.

In the gear plate 73, male screws 81 and 82 are attached to the fixing holes 73b and 73c. The male screws 81 and 82 are fastened and fixed to the female screws 83 and 84 of the device housing 56. Accordingly, the gear plate 73 is fixed to the device housing 56. As will be described later, one of the plurality of male screws 82 also serves to fasten and fix the cover member 60, and is fastened and fixed to the device housing 56 through a fixing hole 60a of the cover member 60 and the fixing hole 73b of the gear plate 73. The fixing unit for fixing the gear plate 73 to the device housing 56 is not limited to two locations of the fixing holes 73b and 73c, and may be three or more locations.

As described above, the device housing 56 pivotally supports the first sub-gear train 74 and the second sub-gear train 75. The spreading rollers 63 and 64 pivotally support the gears 76e and 76d. The gear plate 73 pivotally supports the rotational shafts of the gears 76a to 76c of the third sub-gear train 76 and is fixed to the device housing 56.

The drive transmission gear train 72 is pivotally supported directly on the device housing 56 or via the spreading rollers 63 and 64 and the gear plate 73, and the cover member 60 is fixed to the device housing 56. The cover member 60 is formed in a box shape that covers the drive transmission gear train 72. The cover member 60 includes a plurality of fixing holes 60a.

In the cover member 60, the male screws 82 are attached to the plurality of fixing holes 60a. The male screws 82 are fastened and fixed to the female screws 84 and 85 of the device housing 56. Accordingly, the cover member 60 is fixed to the device housing 56.

Figure 19:
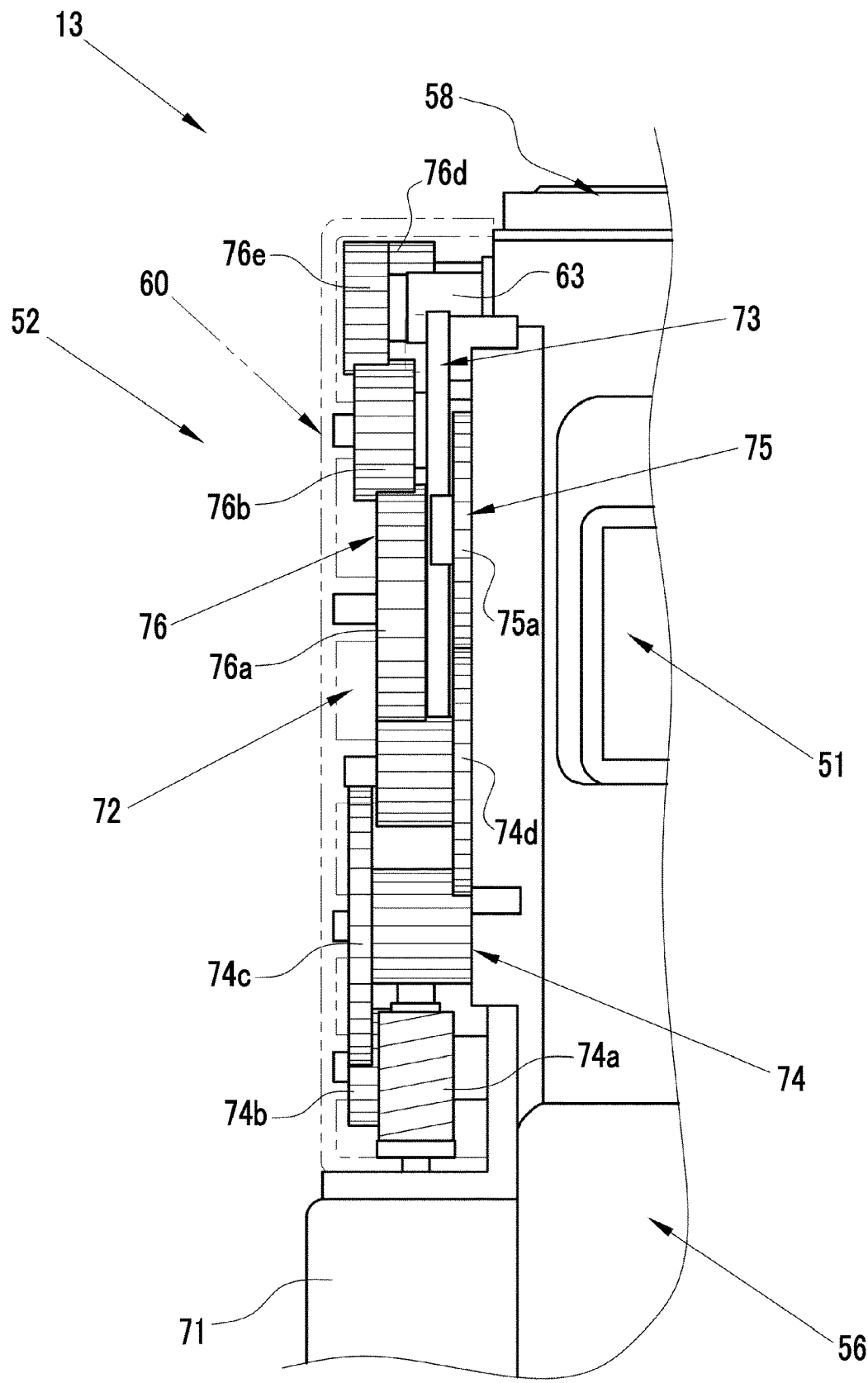
FIG. 19 is a cross-sectional view of a main part of an edge part of the roller drive mechanism.

As shown in FIG. 19, in a state where the drive transmission gear train 72 is attached to the device housing 56 and the gear plate 73 and the cover member 60 are fixed to the device housing 56, the second sub-gear train 75 is positioned inside the gear plate 73, that is, a of the gear plate 73 facing the device housing 56. On the other hand, the third sub-gear train 76 is positioned on an outside of the gear plate 73, that is, on a side opposite to the device housing 56. In the first sub-gear train 74, the gear disposed inside the gear plate 73 and the gear disposed outside the gear plate 73 are mixed. In FIG. 19, in order to prevent complication, a cross-sectional view of the cover member 60 is omitted and is represented by a dashed double-dotted line.

As described above, in the digital camera 10 including a printer, the gears 76a to 76c which are a part of the drive transmission gear train 72 are fixed to the device housing 56 in a state of being pivotally supported by the plate-shaped gear plate 73. Thus, during drive transmission, a reaction force acting between the rotating gears 76a and 76c acts on the gear plate 73, but the plate-shaped and highly rigid gear plate 73 is less likely to bend, and positional variations of the pivotally supported gears 76a to 76c can be suppressed. Accordingly, it is possible to improve the feeding accuracy of the instant film 28 by the transport roller pair 53, it is possible to prevent spreading unevenness of the developer by the spreading roller pair 54, and it is possible to improve the image quality.

In a case where the gear is pivotally supported only by the device housing or the cover member that covers the drive transmission gear train as in the printer of the related art, since the cover member is formed in the box shape, the gear is pivotally supported at a portion positioned outside the cover member (a portion positioned on the side opposite to the device housing with the drive transmission gear train interposed therebetween). Since an interval from a rising edge of the device housing side to the bearing unit is large, the cover member is likely to bend, and the positional variations of the pivotally supported gears are large. On the other hand, in the present invention, since the gear is pivotally supported by the gear plate 73 separate from the cover member 60 described above, such a case does not occur.

As described above, in the gear plate 73, the portion connecting the reference holes to each other is formed in the linear shape. It is possible to avoid the curving of the gear plate 73 and improve the rigidity by forming the portion connecting the reference holes to each other in the linear shape and not disposing a recessed shape in the middle thereof. It is possible to obtain a shape without waste that does not interfere with other parts by adopting such a shape. Further, in the present embodiment, since the positioning hole 73a, the fixing hole 73c, and the support hole 73f are set as apices and the support hole 73f is formed in the linear shape between these holes, the gear plate 73 is formed in a substantially triangular shape. Accordingly, the gear plate 73 has a shape that is less likely to bend and has high rigidity. An overall shape of the gear plate 73 is not limited thereto, and the portion connecting between the reference holes may be formed in the linear shape, and the overall shape of the gear plate 73 may be appropriately changed depending on the disposing of the reference holes.

Since the first and second sub-gear trains 74 to 76 are dispersedly disposed inside and outside the gear plate 73, the reaction force received from the gear to the gear plate 73 is also small. Accordingly, it is possible to further suppress the positional variations of the pivotally supported gears 76a to 76c.

The gears are pivotally supported by the gear plate 73, and thus, a degree of freedom in a layout of the gears constituting the drive transmission gear train 72 is improved. Accordingly, gears of different paths can be disposed close to each other. Thus, the number of gears can be reduced, and the cost can be reduced. Since the gear plate 73 can maintain rigidity even though a thickness of the gear plate 73 is smaller than a thickness of the cover member 60, the gear plate 73 can be formed to be thin, and the space can be saved in the width direction of the printer unit 13. Since the gears are held by the gear plate 73, the strength of the cover member 60 can be reduced to improve an appearance design.

In the above embodiment, the gear plate 73 pivotally supports the rotational shafts of the gears constituting the drive transmission gear train 72, but the present invention is not limited thereto. The gear plate may pivotally support any one of the rotational shaft of the transport roller pair 53 or the rotational shaft of the spreading roller pair 54. In the above embodiment, although the example in which the present invention is applied to the digital camera including a printer is used, the present invention is not limited thereto, and the present invention may be applied to a single printer.

In the above embodiment, a hardware structure of a processing unit that executes various kinds of processing such as the controller 59 includes various processors to be described below. The various processors include a central processing unit (CPU) which is a general-purpose processor that functions as various processing units by executing software (program), a graphical processing unit (GPU), a programmable logic device (PLD) such as a field programmable gate array (FPGA) which is a processor capable of changing a circuit configuration after manufacture, a dedicated electric circuit which is a processor having a circuit configuration specifically designed to execute various processing, and the like.

One processing unit may be constituted by one of these various processors, or may be constituted by a combination of two or more processors of the same type or different types (for example, a combination of a plurality of FPGAs, a combination of a CPU and an FPGA, a combination of a CPU and a GPU, or the like). The plurality of processing units may be constituted by one processor. As an example in which the plurality of processing units are constituted by one processor, firstly, one processor is constituted by a combination of one or more CPUs and software as represented by computers such as clients and servers, and this processor functions as the plurality of processing units. Secondly, a processor that realizes the functions of the entire system including the plurality of processing units via one Integrated Circuit (IC) chip is used as represented by a system on chip (SoC). As described above, the various processing units are constituted by using one or more of the various processors as the hardware structure.

Further, more specifically, an electric circuitry in which circuit elements such as semiconductor elements are combined can be used as the hardware structure of these various processors.

EXPLANATION OF REFERENCES

10: digital camera including printer
11: camera body
12: imaging unit
13: printer unit
15: imaging window
16A: release switch
16B: release switch
17: rear display unit
18: operating part
18a: menu switch
18b: print switch
19: imaging optical system
20: solid-state imaging element
21: film discharge port
22: loading lid
22a: film holding portion
22c: hinge portion
23: film pack room
23a, 23b: both side surface
23c: cut-off portion
23d: positioning protrusion
23e: bottom surface
23f: elastic member
23g: top surface
23h: cut-off portion
24: instant film pack
24a, 24b: side surface
24c: protrusion
24e: top surface
26: case
27: film press plate
27a: sheet
27b: sheet
27c: opening
27d: hole
27e: opening
27f: hole
27g: lower end portion
27h: lower end portion
28: instant film
28a: exposure surface
30: film cover
31: case member
31a: exposure aperture
31b: cut-off portion
31c: feeding port
31d: light shielding seal
32: cover
32a: opening
32b: unit support protrusion
32c: caulking pin
32d: support piece
33: mask sheet
33a: screen opening
34: photosensitive sheet
35: cover sheet
36: developer pod
37: trap portion
38: developer
39: gap
40: image observation surface
51: exposure head
52: roller drive mechanism
53: transport roller pair
54: spreading roller pair
55: spreading control member
55a: support member
56: device housing
57: claw member
58: discharge guide
59: controller
60: cover member
60a: fixing hole
61: capstan roller
61a: spike roller member
61b: drive gear
61c: rotational shaft
61d: one end portion
62: pinch roller
62a: roller member
62b: drive gear
62c: rotational shaft
63, 64: spreading roller
63d, 64d: one end portion
66: spring
67: spring
71: DC motor
72: drive transmission gear train
73: gear plate
73a: positioning hole
73b, 73c: fixing hole
73d, 73e, 73f: support hole
73g, 73h, and 73i: portion connecting holes

74: first sub-gear train
74*a*: worm gear
74*b*, 74*c*, 74*d*: gear
75: second sub-gear train
75*a*: gear
76: third sub-gear train
76*a* to 76*e*: gear
77: fitting hole
78*a*, 78*b*: fitting hole
80: positioning pin
81, 82: male screw
83, 84, 85: female screw

What is claimed is:

1. A printer that exposes an image to an instant film including a developer pod including a developer, and spreads the developer, comprising:
 a transport roller that transports the instant film to a discharge port;
 a spreading roller that is disposed on a downstream side in a transport direction with respect to the transport roller, the spreading roller spreading the developer by crushing the developer pod in a state of pinching the instant film;
 a device housing that includes the transport roller and the spreading roller;
 a roller drive mechanism that is attached to the device housing, the roller drive mechanism including a drive transmission gear train that drives the transport roller and the spreading roller; and
 a box-shaped cover member that covers the roller drive mechanism between the device housing and the cover member,
 wherein the roller drive mechanism includes a plate-shaped gear plate that is separate from the device housing and the cover member, the gear plate being fixed to the device housing at least two locations, and pivotally supporting at least one of a rotational shaft of the transport roller, a rotational shaft of the spreading roller, or a rotational shaft of the drive transmission gear train, and
 a gear provided in the rotational shaft of the transport roller, a gear provided in the rotational shaft of the spreading roller, and the drive transmission gear train are disposed such that a part of the gears are located between the gear plate and the device housing and another part of the gears are located between the gear plate and the cover member.

2. The printer according to claim 1,
 wherein the gear plate includes a fixing unit for being fixed to the device housing, and a bearing unit for pivotally supporting at least one of the rotational shafts, and
 a portion connecting the fixing units, the bearing units, or the fixing unit and the bearing unit is formed in a linear shape.

3. The printer according to claim 1,
 wherein the roller drive mechanism includes a motor as a drive source and the drive transmission gear train,
 the drive transmission gear train includes:
  a first sub-gear train that transmits a rotational driving force from the motor;
  a second sub-gear train that receives the transmission of the rotational driving force from the first sub-gear train, and transmits the rotational driving force to the transport roller; and
  a third sub-gear train that receives the transmission of the rotational driving force from the first sub-gear train, and transmits the rotational driving force to the spreading roller,
 the second sub-gear train is disposed on a side close to the device housing with respect to the gear plate, and
 the third sub-gear train is disposed on a side opposite to the device housing with respect to the gear plate.

4. A digital camera including a printer comprising;
 the printer according to claim 1; and
 an imaging unit that includes an imaging optical system, and images a subject image to output image data to the printer.

* * * * *